US012652667B2

(12) United States Patent
Hwang et al.

(10) Patent No.: US 12,652,667 B2
(45) Date of Patent: Jun. 9, 2026

(54) METHOD AND DEVICE FOR TRANSMITTING AND RECEIVING WIRELESS SIGNALS IN WIRELESS COMMUNICATION SYSTEM

(71) Applicant: LG Electronics Inc., Seoul (KR)

(72) Inventors: Seunggye Hwang, Seoul (KR); Jaehyung Kim, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 18/554,111

(22) PCT Filed: Apr. 5, 2022

(86) PCT No.: PCT/KR2022/004837
§ 371 (c)(1),
(2) Date: Oct. 5, 2023

(87) PCT Pub. No.: WO2022/215992
PCT Pub. Date: Oct. 13, 2022

(65) Prior Publication Data
US 2024/0196400 A1      Jun. 13, 2024

(30) Foreign Application Priority Data
Apr. 5, 2021      (KR) ........................ 10-2021-0044145

(51) Int. Cl.
H04W 4/00        (2018.01)
H04L 1/00        (2006.01)
(Continued)

(52) U.S. Cl.
CPC ....... H04W 72/1273 (2013.01); H04L 1/0061 (2013.01); H04L 1/0068 (2013.01); H04W 76/20 (2018.02)

(58) Field of Classification Search
None
See application file for complete search history.

(56) References Cited

U.S. PATENT DOCUMENTS

| | | | | |
|---|---|---|---|---|
| 2019/0165880 A1* | 5/2019 | Hakola | ................. | H04L 1/1854 |
| 2023/0283427 A1* | 9/2023 | Fu | ..................... | H04W 52/0235 |
| | | | | 370/329 |
| 2024/0163846 A1* | 5/2024 | Sheng | ................. | H04W 68/025 |

FOREIGN PATENT DOCUMENTS

| | | |
|---|---|---|
| KR | 10-2019-0129721 | 11/2019 |
| WO | WO 2020/067623 | 4/2020 |
| WO | WO 2020/167184 | 8/2020 |

OTHER PUBLICATIONS

International Search Report and Written Opinion in International Appln. No. PCT/KR2022/004837, mailed on Jul. 28, 2022, 13 pages (with English translation).

(Continued)

*Primary Examiner* — Bob A Phunkulh
(74) *Attorney, Agent, or Firm* — Fish & Richardson P.C.

(57)        ABSTRACT

According to at least one of the embodiments disclosed in the present specification, a terminal may receive tracking reference signal (TRS) configuration information related to a radio resource control (RRC) idle/inactive state, receive physical downlink shared channel (PDSCH) scheduling information in the RRC idle/inactive state, determine PDSCH resource mapping on the basis of the PDSCH scheduling information, and receive PDSCH and TRS in the RRC idle/inactive state on the basis of the determined PDSCH resource mapping and the TRS configuration information.

11 Claims, 17 Drawing Sheets

(51) Int. Cl.
    *H04W 72/1273*     (2023.01)
    *H04W 76/20*      (2018.01)

(56)            References Cited

OTHER PUBLICATIONS

Nokia & Nokia Shanghai Bell, "Potential TRS/CSI-RS occasion(s)," R2-2103496, 3GPP TSG-RAN WG2 Meeting #113bis Electronic, Online, Apr. 12-20, 2021, 6 pages.
Qualcomm Incorporated, "TRS/CSI-RS for idle/inactive UE power saving," R1-2101475, 3GPP TSG-RAN WG1 #104-e, e-Meeting, Jan. 25-Feb. 5, 2021, 8 pages.

* cited by examiner

DL assingment-to-PDSCH offset (K0)

PDSCH-to-HARQ-ACK reporting offset (K1)

UL grant-to-PUSCH offset (K2)

Complex valued symbols          Virtual resource block

METHOD AND DEVICE FOR TRANSMITTING AND RECEIVING WIRELESS SIGNALS IN WIRELESS COMMUNICATION SYSTEM

CROSS-REFERENCE TO RELATED APPLICATIONS

This application is a National Stage application under 35 U.S.C. § 371 of International Application No. PCT/KR2022/004837, filed on Apr. 5, 2022, which claims the benefit of Korean Application No. 10-2021-0044145, filed on Apr. 5, 2021. The disclosures of the prior applications are incorporated by reference in their entirety.

TECHNICAL FIELD

The present disclosure relates to a wireless communication system, and more particularly, to a method and apparatus for transmitting and receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, there is provided a method of receiving a signal by a user equipment (UE) in a wireless communication system. The method may include: receiving tracking reference signal (TRS) configuration information related to a radio resource control (RRC) Idle/Inactive state; receiving physical downlink shared channel (PDSCH) scheduling information in the RRC Idle/Inactive state; determining PDSCH resource mapping based on the PDSCH scheduling information; and receiving a PDSCH and a TRS in the RRC Idle/Inactive state based on the determined PDSCH resource mapping and the TRS configuration information. Based on i) that TRS resources related to the TRS configuration information overlap at least partially with PDSCH resources related to the PDSCH scheduling information and ii) that TRS availability information indicates that the TRS can be actually received, the UE may determine the PDSCH resource mapping by assuming that the PDSCH is punctured on resources where the PDSCH and the TRS overlap.

The UE may determine the PDSCH resource mapping by assuming that the PDSCH is punctured on the overlapping resources in a unit of a resource element (RE).

The UE may receive the TRS by assuming that the PDSCH is punctured on the overlapping resources.

The TRS availability information may be received from a base station (BS) through higher layer signaling.

Based on that the PDSCH is related to a specific radio network temporary identifier (RNTI)-based scrambling sequence initialization or that a cyclic redundancy check (CRC) of a physical downlink control channel (PDCCH) carrying the PDSCH scheduling information is scrambled with the specific RNTI, the UE may assume that the PDSCH is punctured on the overlapping resources.

The specific RNTI may include any one of a paging-RNTI (P-RNTI), a random access-RNTI (RA-RNTI), a message B-RNTI (MsgB-RNTI), or a temporary cell-RNTI (TC-RNTI).

The UE may assume that although each of the overlapping resources is counted as a complex symbol of the PDSCH, the PDSCH is not actually mapped to the overlapping resources.

According to another aspect of the present disclosure, a processor-readable recording medium recording a program for performing the signal reception method may be provided.

According to another aspect of the present disclosure, a UE for performing the signal reception method may be provided.

According to another aspect of the present disclosure, a device for performing the signal reception method may be provided.

According to another aspect of the present disclosure, there is provided a method of transmitting a signal by a BS in a wireless communication system. The method may include: transmitting TRS configuration information related to an RRC Idle/Inactive state of a UE; transmitting PDSCH scheduling information during the RRC Idle/Inactive state of the UE; determining PDSCH resource mapping based on the PDSCH scheduling information; and transmitting a PDSCH and a TRS based on the determined PDSCH resource mapping and the TRS configuration information during the RRC Idle/Inactive state of the UE. Based on i) that TRS resources related to the TRS configuration information overlap at least partially with PDSCH resources related to the PDSCH scheduling information and ii) that TRS availability information indicates that the TRS can be actually transmitted, the BS may puncture the PDSCH on resources where the PDSCH and the TRS overlap in determining the PDSCH resource mapping.

According to another aspect of the present disclosure, a BS for performing the signal transmission method may be provided.

Advantageous Effects

According to an embodiment of the present disclosure, the priority between a scheduled physical downlink shared channel (PDSCH) and a tracking reference signal (TRS)

may be defined in an idle/inactive mode, thereby resolving ambiguity issues between a base station (BS) and a user equipment (UE).

It will be appreciated by persons skilled in the art that the effects that can be achieved with the present disclosure are not limited to what has been particularly described herein-above and other advantages of the present disclosure will be more clearly understood from the following detailed description taken in conjunction with the accompanying drawings.

BRIEF DESCRIPTION OF THE DRAWINGS

FIGS. 16 to 19 illustrate an example of a communication system 1 and wireless devices applicable to the present disclosure.

DETAILED DESCRIPTION

Figure 1:
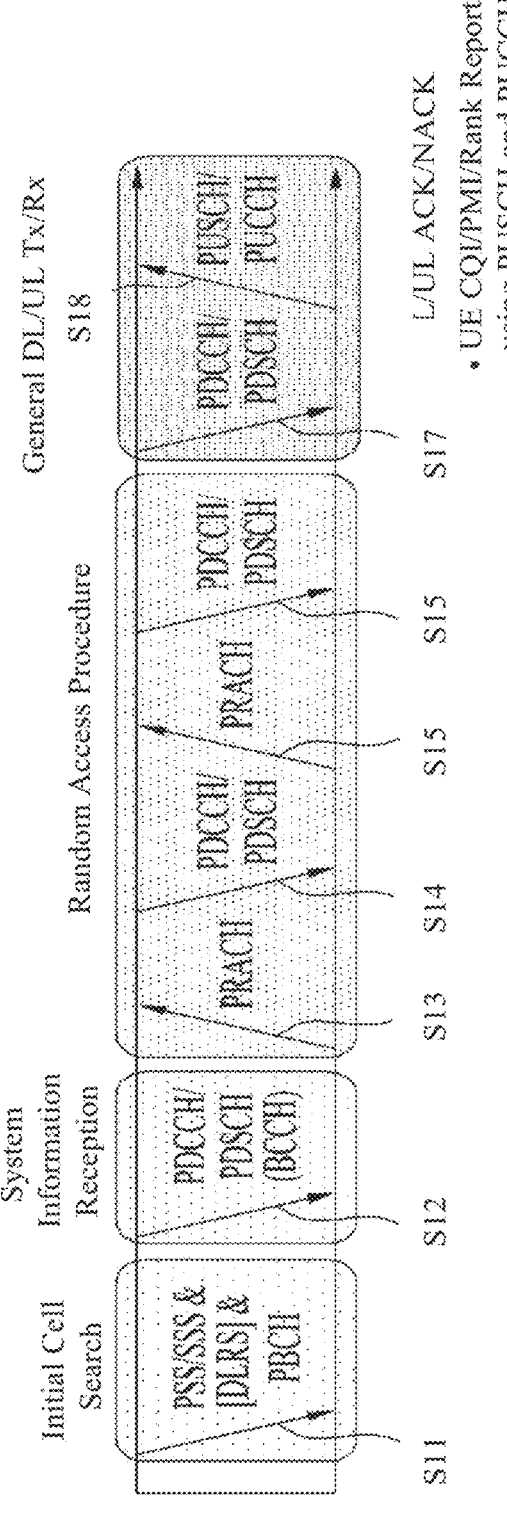
FIG. 1 illustrates physical channels used in a 3rd genera-tion partnership project (3GPP) system as an exemplary wireless communication system, and a general signal trans-mission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio tech-nology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wire-less Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Genera-tion Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of provid-ing a variety of services anywhere and anytime by connect-ing multiple devices and objects is another important issue to be considered for next generation communications. Com-munication system design considering services/UEs sensi-tive to reliability and latency is also under discussion. As such, introduction of new radio access technology consid-ering enhanced mobile broadband communication (eMBB), massive MTC, and Ultra-Reliable and Low Latency Com-munication (URLLC) is being discussed. In an embodiment of the present disclosure, for simplicity, this technology will be referred to as NR (New Radio or New RAT).

For the sake of clarity, 3GPP NR is mainly described, but the technical idea of the present disclosure is not limited thereto.

For the background art relevant to the present disclosure, the definitions of terms, and abbreviations, the following documents may be incorporated by reference.

3GPP LTE

TS 36.211: Physical channels and modulation

TS 36.212: Multiplexing and channel coding

TS 36.213: Physical layer procedures

TS 36.300: Overall description

TS 36.321: Medium Access Control (MAC)

TS 36.331: Radio Resource Control (RRC)

3GPP NR

TS 38.211: Physical channels and modulation

TS 38.212: Multiplexing and channel coding

TS 38.213: Physical layer procedures for control

TS 38.214: Physical layer procedures for data

TS 38.300: NR and NG-RAN Overall Description

TS 38.321: Medium Access Control (MAC)

TS 38.331: Radio Resource Control (RRC) protocol specification

TS 37.213: Introduction of channel access procedures to unlicensed spectrum for NR-based access Terms and Abbreviations PSS: Primary Synchronization Signal SSS: Secondary Synchronization Signal CRS: Cell reference signal CSI-RS: Channel State Information Reference Signal TRS: Tracking Reference Signal SS: Search Space CSS: Common Search Space USS: UE-specific Search Space PDCCH: Physical Downlink Control Channel; The PDCCH is used to represent PDCCHs of various struc-tures which may be used for the same purpose in the following description.

PO: Paging Occasion

RE: Resource Element

VRB: Virtual Resource Block

PRB: Physical Resource Block

RS: Reference Signal

TRS: Tracking Reference Signal

CSI-RS: Channel-State Information Reference Signal

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
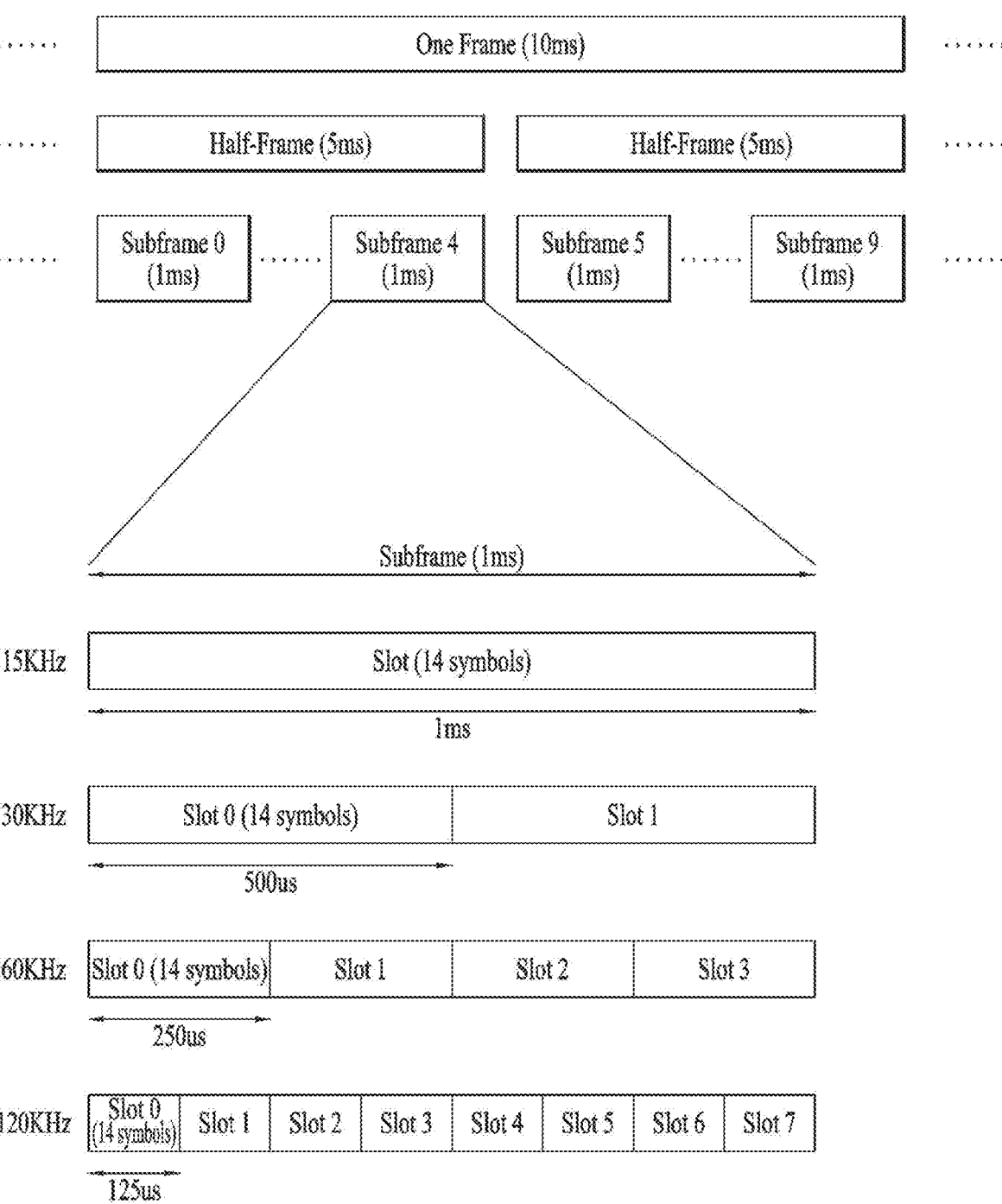
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame, u}_{slot}$: Number of slots in a frame
$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
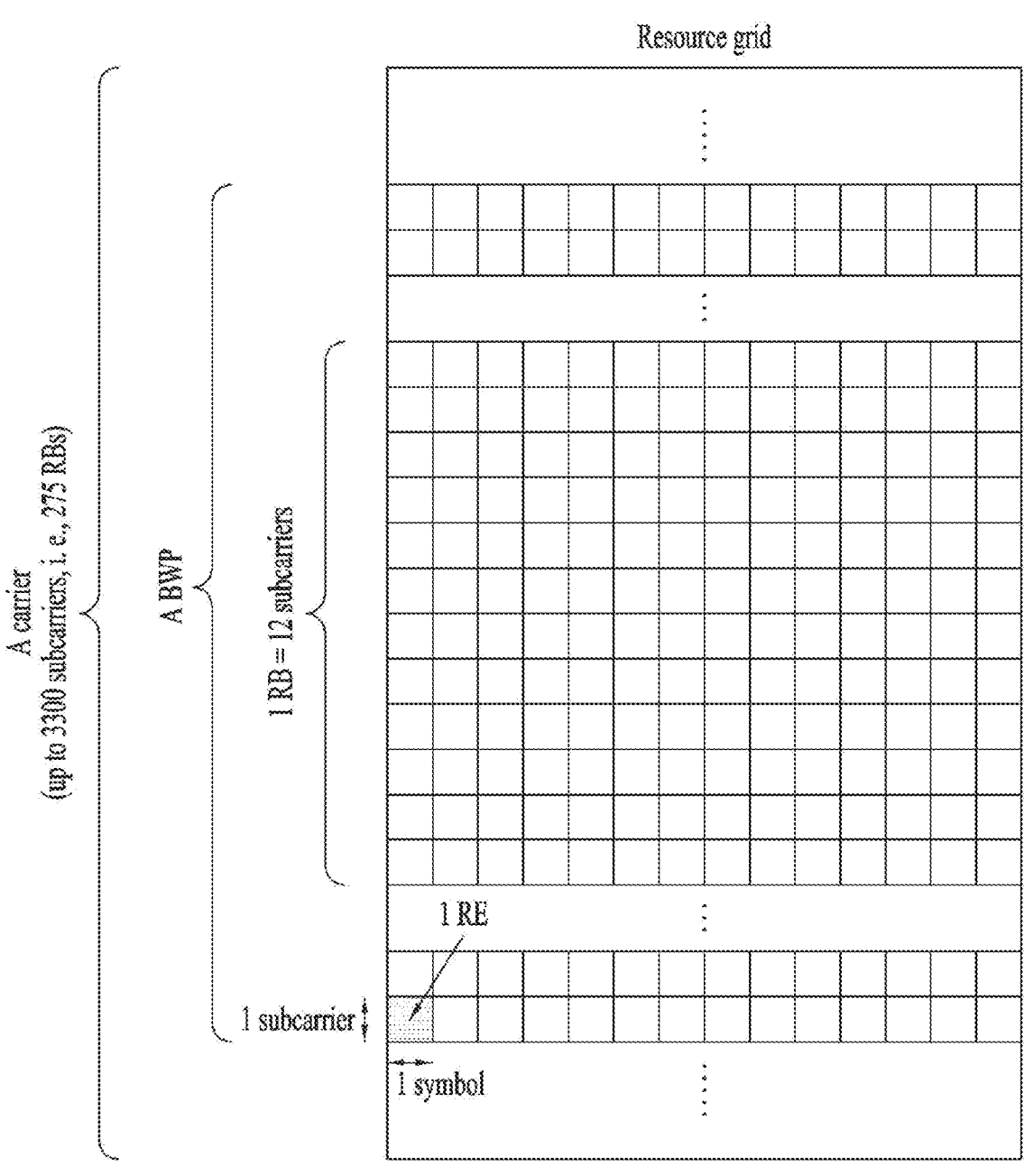
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
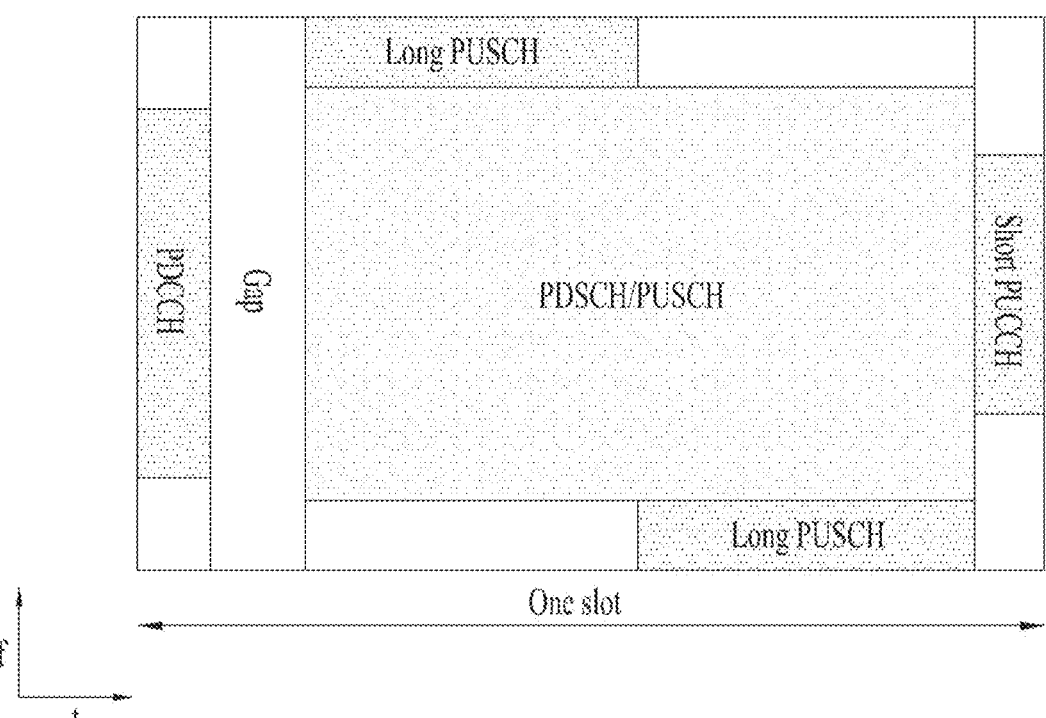
FIG. 4 illustrates exemplary mapping of physical chan-nels in a slot.

FIG. 4 illustrates an example of mapping physical channels in a slot. In an NR system, a frame is characterized by a self-contained structure in which all of a DL control channel, DL or UL data, and a UL channel may be included in one slot. For example, the first N symbols of a slot may be used to carry a DL channel (e.g., PDCCH) (hereinafter, referred to as a DL control region), and the last M symbols of the slot may be used to carry a UL channel (e.g., PUCCH)

(hereinafter, referred to as a UL control region). Each of N and M is an integer equal to or larger than 0. A resource area (hereinafter, referred to as a data region) between the DL control region and the UL control region may be used to transmit DL data (e.g., PDSCH) or UL data (e.g., PUSCH). A guard period (GP) provides a time gap for switching from a transmission mode to a reception mode or from the reception mode to the transmission mode. Some symbols at a DL-to-UL switching time in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
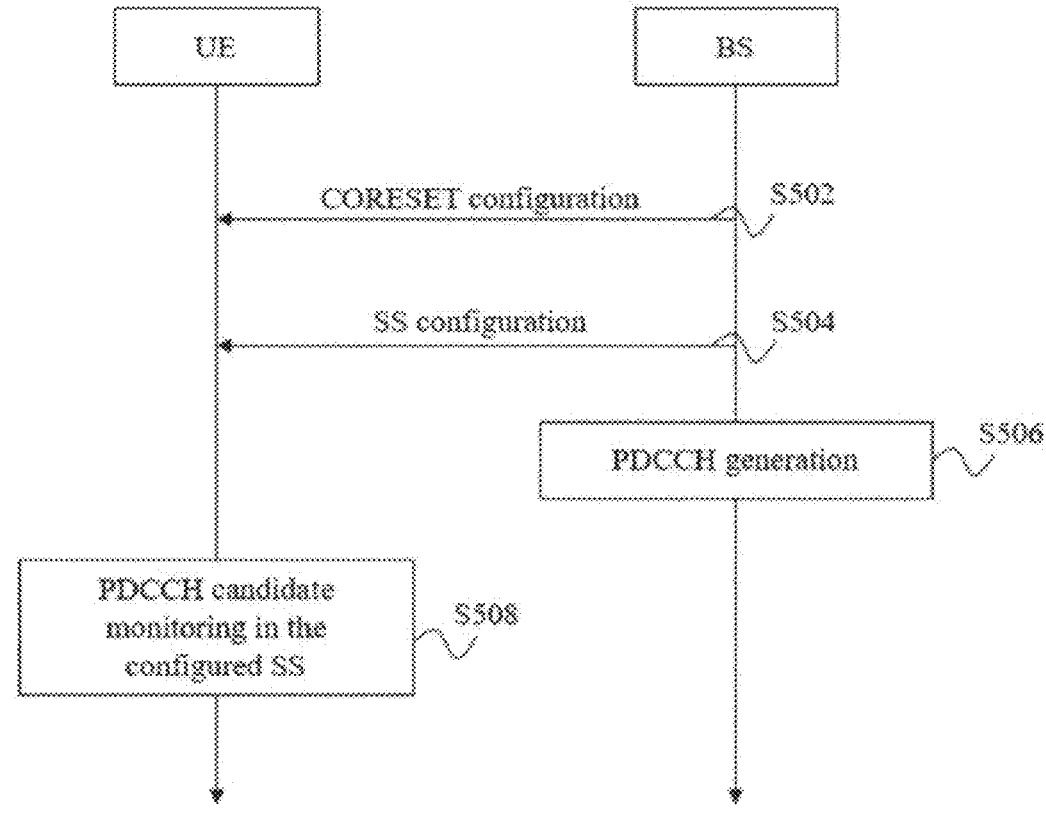
FIG. 5 illustrates an exemplary physical downlink control channel (PDCCH) transmission and reception process.

FIG. 5 illustrates an exemplary PDCCH transmission/reception process.

Referring to FIG. 5, a BS may transmit a control resource set (CORESET) configuration to a UE (S502). A CORESET is defined as a resource element group (REG) set having a given numerology (e.g., a subcarrier spacing (SCS), a cyclic prefix (CP) length, and so on). An REG is defined as one OFDM symbol by one (physical) resource block (P)RB. A plurality of CORESETs for one UE may overlap with each other in the time/frequency domain. A CORESET may be configured by system information (e.g., a master information block (MIB)) or higher-layer signaling (e.g., radio resource control (RRC) signaling). For example, configuration information about a specific common CORESET (e.g., CORESET #0) may be transmitted in the MIB. For example, a PDSCH carrying system information block 1 (SIB1) may be scheduled by a specific PDCCH, and CORESET #0 may be used to transmit the specific PDCCH. System information (SIB1) broadcast in a cell includes cell-specific PDSCH configuration information, PDSCH-ConfigCommon. PDSCH-ConfigCommon includes a list (or look-up table) of parameters related to a time-domain resource allocation, pdsch-TimeDomainAllocationList. Each pdsch-TimeDomainAllocationList may include up to 16 entries (or rows) each being joint-encoded {K0, PDSCH mapping type, PDSCH start symbol and length (SLIV)}. Aside from (additionally to) pdsch-TimeDomainAllocationList configured through PDSCH-ConfigCommon, pdsch-TimeDomainAllocationList may be provided through a UE-specific PDSCH configuration, PDSCH-Config. pdsch-TimeDomainAllocationList configured UE-specifically has the same structure as pdsch-TimeDomainAllocationList provided UE-commonly. For K0 and an SLIV of pdsch-TimeDomainAllocationList, the following description is referred to.

Further, configuration information about CORESET #N (e.g., N>0) may be transmitted by RRC signaling (e.g., cell-common RRC signaling, UE-specific RRC signaling, or the like). For example, the UE-specific RRC signaling carrying CORESET configuration information may include, but not limited to, various types of signaling such as an RRC setup message, an RRC reconfiguration message, and/or BWP configuration information. Specifically, a CORESET configuration may include the following information/fields.

controlResourceSetId: Indicates the ID of a CORESET.

frequency DomainResources: Indicates the frequency-domain resources of the CORESET. The resources are indicated by a bitmap in which each bit corresponds to an RB group (=6 (consecutive) RBs). For example, the most significant bit (MSB) of the bitmap corresponds to a first RB group in a BWP. An RB group corresponding to a bit having a bit value of 1 is allocated as frequency-domain resources of the CORESET.

duration: Indicates the time-domain resources of the CORESET. It indicates the number of consecutive OFDM symbols included in the CORESET. The duration has a value between 1 and 3.

cce-REG-MappingType: Indicates a control channel element (CCE)-to-REG mapping type. An interleaved type and a non-interleaved type are supported.

interleaverSize: Indicates an interleaver size.

pdcch-DMRS-ScramblingID: Indicates a value used for PDCCH DMRS initialization.

When pdcch-DMRS-ScramblingID is not included, the physical cell ID of a serving cell is used.

precoderGranularity: Indicates a precoder granularity in the frequency domain.

reg-BundleSize: Indicates an REG bundle size.

tci-PresentInDCI: Indicates whether a transmission configuration index (TCI) field is included in DL-related DCI.

tci-StatesPDCCH-ToAddList: Indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown as separately signaled in FIG. 5, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a UE-specific search space (USS) set or a common search space (CSS) set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: Indicates the ID of an SS.

controlResourceSetId: Indicates a CORESET associated with the SS.

monitoringSlotPeriodicity AndOffset: Indicates a periodicity (in slots) and offset (in slots) for PDCCH monitoring.

monitoringSymbolsWithinSlot: Indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: Indicates the number of PDCCH candidates (one of values 0, 1, 2, 3, 4, 5, 6, and 8) for each AL where AL={1, 2, 4, 8, 16}.

searchSpaceType: Indicates CSS or USS as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is configured as one of an interleaved CCE-to-REG type and a non-interleaved CCE-to-REG type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is set on a CORESET basis.

Figure 6:
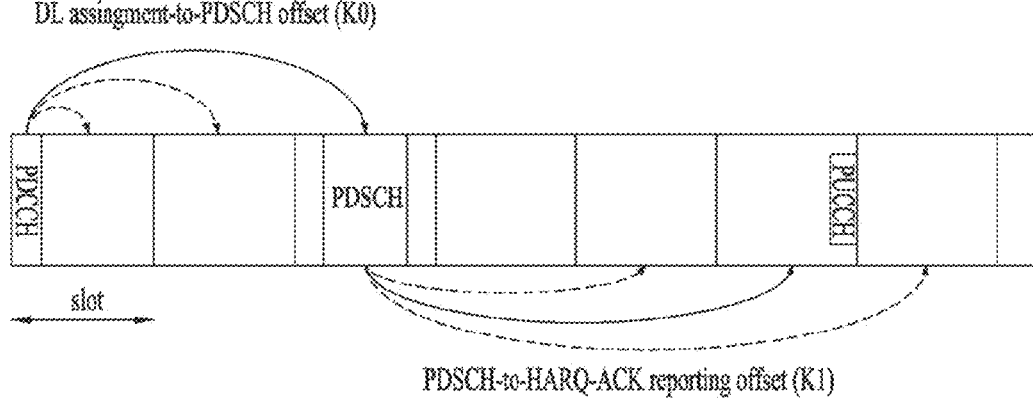
FIG. 6 illustrates an exemplary physical downlink shared channel (PDSCH) reception and acknowledgement/negative acknowledgement (ACK/NACK) transmission process.

FIG. 6 illustrates an exemplary PDSCH reception and ACK/NACK transmission process. Referring to FIG. 6, the UE may detect a PDCCH in slot #n. The PDCCH includes DL scheduling information (e.g., DCI format 1_0 or DCI format 1_1), and indicates a DL assignment-to-PDSCH offset, K0 and a PDSCH-HARQ-ACK reporting offset, K1. For example, DCI format 1_0 or DCI format 1_1 may include the following information.

Frequency domain resource assignment: Indicates an RB set allocated to a PDSCH.

Time domain resource assignment: Indicates K0 (e.g., slot offset), the starting position (e.g., OFDM symbol index) of the PDSCH in slot #n+K0, and the duration (e.g., the number of OFDM symbols) of the PDSCH.

PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 7:
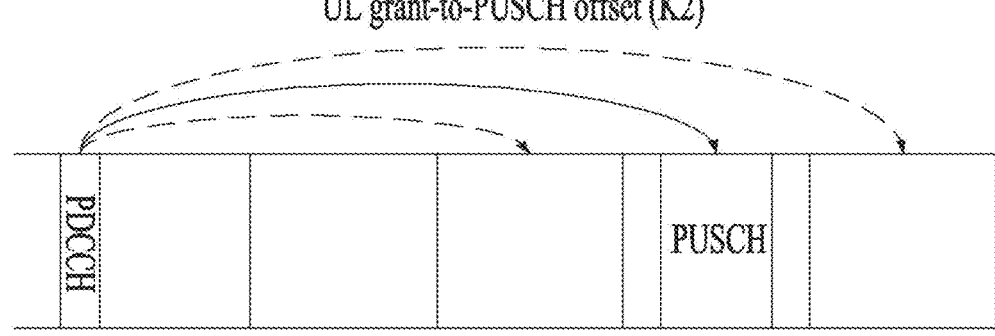
FIG. 7 illustrates an exemplary physical uplink shared channel (PUSCH) transmission process.

FIG. 7 illustrates an exemplary PUSCH transmission procedure. Referring to FIG. 7, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g., OFDM symbol index) and duration (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

PDSCH Resource for Idle/Inactive Mode UE Configured with TRS/CSI-RS

According to an embodiment of the present disclosure, methods for an idle/inactive mode UE to receive a scheduled PDSCH (e.g., methods for assuming PDSCH RE mapping, etc.) when information on an RS related to tracking/measurement is provided to the corresponding UE for UE power saving will be disclosed.

In LTE, a synchronization signal (i.e., PSS/SSS) is transmitted at intervals of 10 milliseconds (ms), and a CRS is transmitted in almost every subframe and PRB (always-on RS). Therefore, if a UE intends to perform time/frequency synchronization, tracking, or measurement, the UE may easily use an always-on RS. In Rel-16 NR, a UE may use an SSB for measurement and/or time-frequency tracking in an idle/inactive mode. However, considering that the default transmission interval of the SSB including an SSS available for measurement is 20 ms, which is a relatively long time, and that there are no always-on RSs such as an LGE CRS, the NR UE may unnecessarily wake up or experience degradation in time-frequency tracking performance. In communication systems such as LTE and NR, paging is used for RRC setup triggering, system information modification, and/or PWS/ETWS notification. When the UE monitors a PDCCH at the location of a paging occasion (PO) configured by the BS and detects DCI scrambled with a P-RNTI, the UE performs operations indicated by the DCI.

According to Rel-16 NR, i) a CSI-RS refers to an RS available for CSI estimation, beam management, and/or time-frequency tracking; and ii) a TRS refers to an RS configured to enhance the performance of time/frequency tracking and estimate delay spread and Doppler spread. The configuration of the CSI-RS/TRS corresponds to information that the UE receives through RRC signaling while in the connected mode. In the idle or inactive mode, the UE may not expect transmission of the CSI-RS/TRS. In Rel-17 NR, methods for allowing idle or inactive mode UEs to receive the TRS or CSI-RS (or to assume transmission thereof) are being discussed by reusing the CSI-RS transmission and structure thereof in Rel-16 NR. If idle or inactive mode UEs are allowed to use the TRS or CSI-RS for time/frequency tracking, power consumption efficiency may be improved.

If the UE is scheduled with a PDSCH and expects to receive the PDSCH, both the BS and UE need to assume the same reference point for PDSCH RE mapping. In particular, if the UE is in the connected mode, the UE may assume transmission and reception of the TRS/CSI-RS based on configuration information on the corresponding RSs as described above. Additionally, the UE in the connected mode may assume the RE mapping of a scheduled PDSCH based on the assumption of the transmission and reception of the corresponding RSs. For example, when some of the configured TRS/CSI-RS resource(s) overlap with at least some of the resources of the scheduled PDSCH (e.g., when some of the configured TRS/CSI-RS resource(s) overlap with at least some resources in the time and/or frequency domains), and when it is indicated that the REs of the TRS/CSI-RS are not available for PDSCH RE mapping, the UE may assume that no PDSCH will be mapped to the corresponding REs if the UE is configured with the TRS/CSI-RS.

Since legacy UEs based on Rel-16 do not have information on transmission and reception of the TRS/CSI-RS, which may be assumed in the idle/inactive mode, there are no defined operations for assuming PDSCH RE mapping in consideration of the TRS/CSI-RS transmission and reception. In Rel-16, a paging PDSCH may overlap with the TRS for connected mode UEs, but any handling methods therefor are not defined. Thus, the BS is implemented such that the BS adjusts the PDSCH coding rate to compensate for reception performance degradation.

However, the TRS related to the idle/inactive mode may be a periodic TRS, and the periodic TRS has a relatively high density. As a result, it is challenging to schedule a PDSCH while avoiding the periodic TRS.

When the UE is aware of information on the TRS/CSI-RS related to the idle/inactive mode, and when resources for the TRS/CSI-RS overlap with resources for the scheduled PDSCH overlap (at least partially), if the purpose and format of overlapping RE(s) are not specified/defined, ambiguity may arise between the BS and UE. Due to inaccurate assumptions of the UE, PDSCH decoding performance may be degraded, or PDSCH decoding may fail.

To address these issues, in an embodiment of the present disclosure, there is provided a method in which the BS and idle/inactive mode UE determine PDSCH RE mapping by considering that the TRS/CSI-RS related to the idle/inactive mode are transmitted and received on resource(s) for the scheduled PDSCH when the UE is provided with information on the corresponding TRS/CSI-RS. The proposed method may offer advantages in resolving ambiguity issues between the BS and idle/inactive mode UE regarding the RE mapping when the idle/inactive mode UE is scheduled with the PDSCH, thereby providing a structure that enables for PDSCH decoding. Furthermore, in an embodiment of the present disclosure, there is provided a method of mitigating the impact on legacy UEs that expect to receive the same PDSCH by considering the characteristics of a common PDSCH provided to idle/inactive mode UEs (e.g., SIB, paging message, or Msg2/Msg4).

While the following mainly focuses on providing TRS/CSI-RS-related information to idle/inactive mode UEs and using the information for assumptions related to transmission and reception, the present disclosure is not limited thereto. That is, the present disclosure may also be applied when there is an overlap between resources for an arbitrary RS and resources for an arbitrary channel.

For example, when the idle/inactive mode UE acquires information on a TRS/CSI-RS and is capable of assuming transmission and reception thereof, the idle/inactive mode UE may determine assumptions about transmission and reception of a PDSCH in REs overlapping with the TRS/CSI-RS. However, the present disclosure is not limited to the above example and may also be applied to arbitrary signals and channels.

BS Operation

Figure 8:
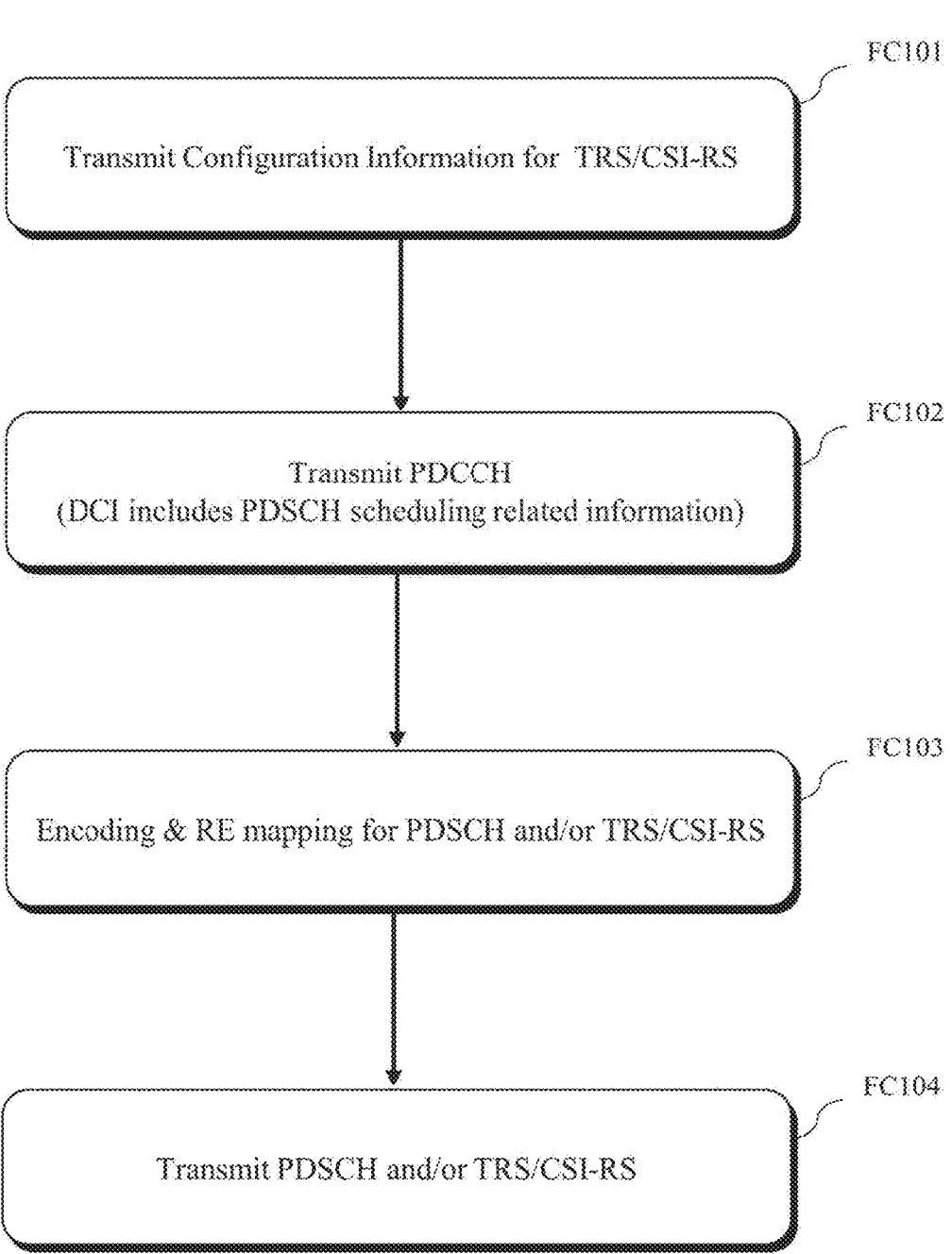
FIGS. 8 and 9 illustrate operational flows of a base station (BS) and a user equipment (UE) according to embodiments of the present disclosure.

FIG. 8 illustrates an operational flow of a BS according to an embodiment of the present disclosure.

Referring to FIG. 8, the BS may create and transmit configuration information related to a TRS/CSI-RS (FC101). For example, the configuration information may be transmitted through higher layer signaling (e.g., SIB or RRC signaling).

When the BS intends to transmit a PDSCH to specific UE(s), the BS may generate DCI including scheduling information on the PDSCH based on the configuration information and transmit the DCI over a PDCCH (FC102). In this case, the DCI may include information related to TRS/CSI-RS transmission and reception along with the PDSCH scheduling information.

Subsequently, the BS may perform a transmission preparation process such as PDSCH encoding and RE mapping based on the PDSCH scheduling information (FC103). During the transmission preparation process, the RE(s) of the TRS/CSI-RS overlapping with the scheduled PDSCH may be considered. Additionally, if there are REs determined to be mapped to the TRS/CSI-RS, RE mapping of the TRS/CSI-RS may be performed concurrently.

Thereafter, the BS may transmit the PDSCH and/or TRS/CSI-RS based on the PDSCH scheduling information transmitted over the PDCCH (FC104).

UE Operation

Figure 9:
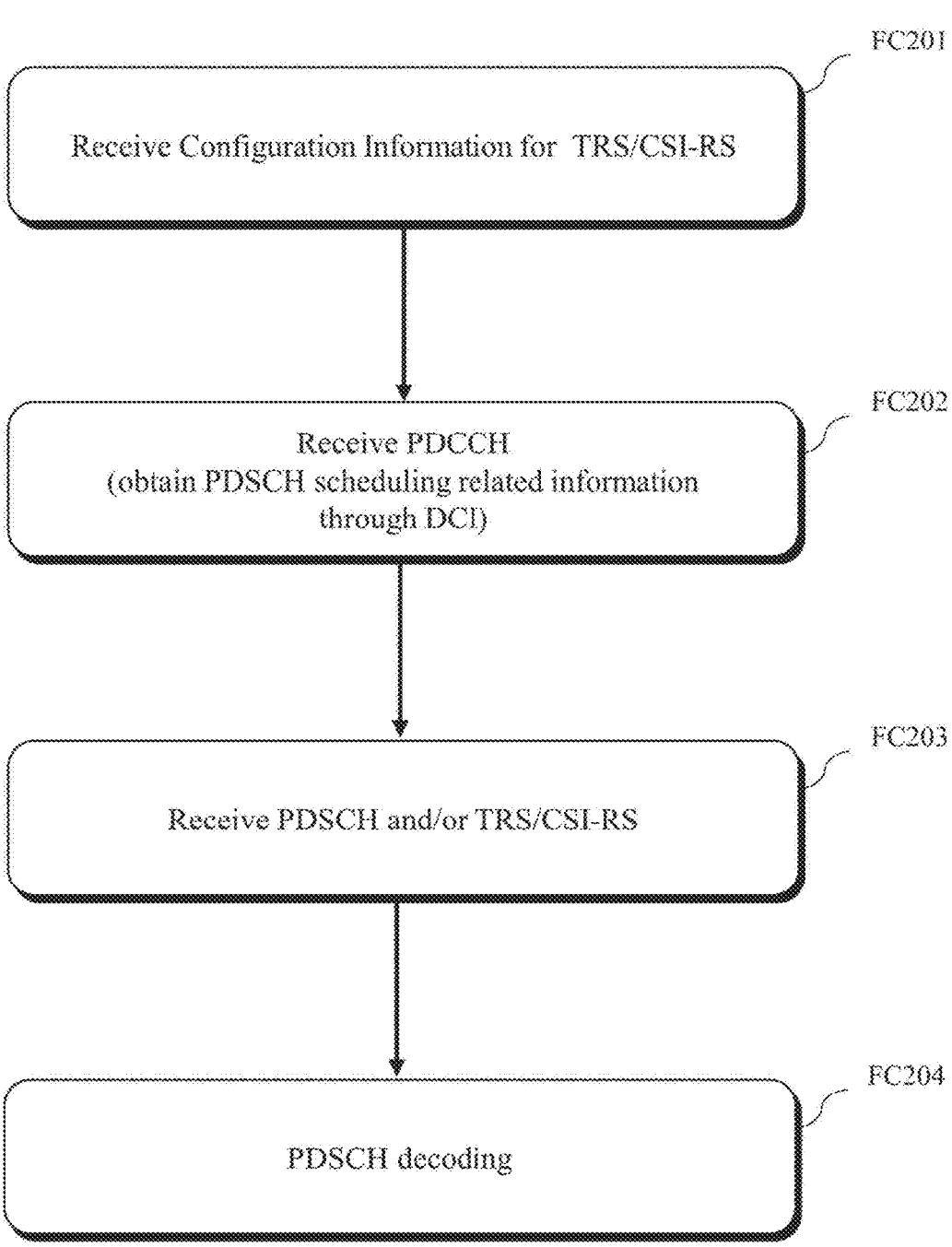

FIG. 9 illustrates an operational flow of a UE according to an embodiment of the present disclosure.

Referring to FIG. 9, the UE may receive configuration information related to a TRS/CSI-RS from a BS and expect the proposed operation, which will be described later (FC201). For example, the configuration information may be received through higher layer signaling (e.g., SIB or RRC signaling).

The UE may attempt to detect a PDCCH at the location of a configured search space (SS) and receive the PDCCH (FC202). If the UE successfully detects the PDCCH, the UE may obtain scheduling information on a PDSCH from DCI included in the corresponding PDCCH. In this case, if the DCI transmitted over the PDCCH, which was successfully detected, contains relevant information, the UE may interpret information in the DCI based on the received configuration information related to the TRS/CSI-RS.

Subsequently, if the UE is scheduled with the PDSCH based on the successfully detected PDCCH, the UE may receive the PDSCH on resources allocated for the scheduled PDSCH (FC203). In this case, the UE may assume the transmission format and mode of the PDSCH based on the configured TRS/CSI-RS information. If there is a TRS/CSI-RS resource that the UE is capable of receiving the TRS/CSI-RS simultaneously with the PDSCH, the UE may also receive the TRS/CSI-RS together.

Thereafter, the UE may decode the received PDSCH (FC204). In this case, the UE may determine RE mapping and/or rate matching applied to the PDSCH based on the configuration information related to the TRS/CSI-RS.

One or more of the proposals in this specification may be combined, or the proposals may be implemented independently without combinations. Some of the terms, symbols, and orders used herein to describe the present disclosure may be replaced with other terms, symbols, and orders as long as the principles of the present disclosure are maintained. Hereinafter, the proposed methods will be described with a focus on a TRS/CSI-RS and a PDSCH, for which the idle/inactive mode UEs may assume transmission and reception. However, the proposed methods may also be applied to other physical channels, signals, and information transmitted over the channels and signals. While the proposed methods will be described based on the NR system, the proposed methods may also be applied to the transmission and reception structures of other wireless communication systems.

For convenience, a UE capable of expecting TRS/CSI-RS transmission and reception in the idle/inactive mode is defined as an I-RS_Cap UE. On the other hand, a UE incapable of expecting the TRS/CSI-RS transmission and reception in the idle/inactive mode is defined as a non-I-RS_Cap UE. A TRS/CSI-RS related to the idle/inactive mode may be referred to briefly as a TRS/CSI-RS. A TRS/CSI-RS occasion may refer to a configured position at which the UE is capable of expecting TRS/CSI-RS transmission in the idle/inactive mode, regardless of whether the TRS/CSI-RS is actually transmitted.

Proposal 1: Puncturing for TRS/CSI-RS RE(s)

In an embodiment of the present disclosure, there is provided a method of puncturing at least some of PDSCH resource(s) received by the I-RS_Cap UE in the idle/inactive mode due to a TRS/CSI-RS. Specifically, i) when there is an overlap between a TRS/CSI-RS occasion and a scheduled PDSCH, and ii) when specific conditions (referred to as Cond-A) are satisfied, the UE may assume that the scheduled PDSCH is punctured (RE level puncturing) at the positions of TRS/CSI-RS REs configured on the TRS/CSI-RS occasion (referred to as 'PDSCH RE puncturing').

Figure 10:
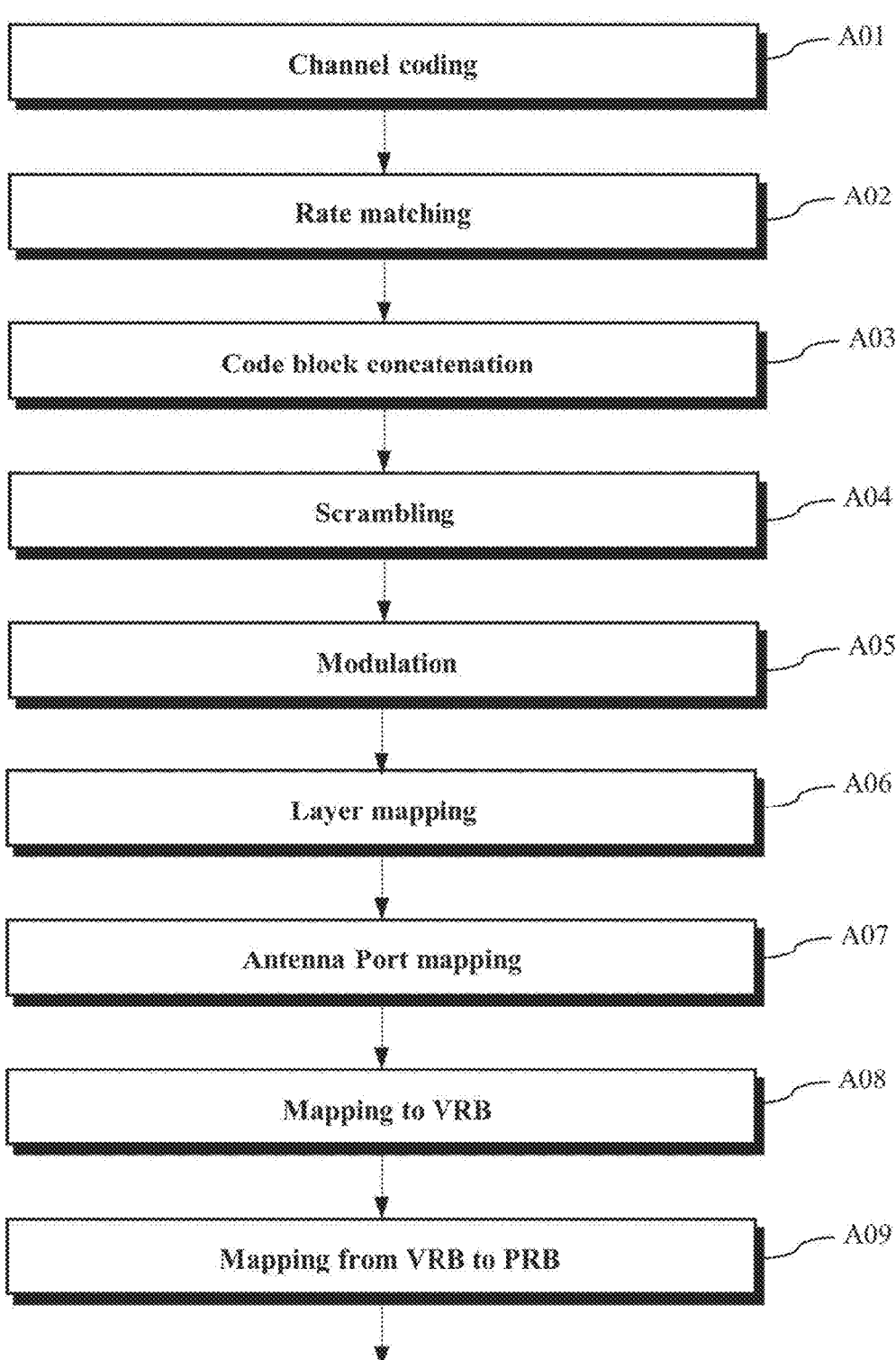
FIG. 10 illustrates a process for processing a downlink signal.

'PDSCH RE puncturing' may be defined as follows. While generating a PDSCH that the BS intends to transmit, the BS proceeds with antenna port mapping in the same way as generating a PDSCH for a UE where 'PDSCH RE puncturing' is not considered (e.g., non-I-RS_Cap UE) (see A01 to A07 in FIG. 10). Then, the blocks of individual complexed symbols where the antenna port mapping is completed are mapped to the REs of virtual resource blocks (VRBs) corresponding to each antenna port. In this case, the conditions for the RE mapping may be defined as follows: 1) PDSCH RE mapping conditions for the UE that does not consider the 'PDSCH RE puncturing' need to be satisfied; but 2) in exceptional cases, if the REs of the corresponding PRB related to the REs of the VRB are subject to the 'PDSCH RE puncturing', each of the corresponding REs is counted as a complexed valued symbol, but PDSCH mapping is not performed on the RE (A08 in FIG. 10). The (I-RS_Cap) UE may operate as follows: i) the (I-RS_Cap) UE may not expect to receive any complex-valued symbols for the REs where 'PDSCH RE puncturing' is applied; and ii) the (I-RS_Cap) UE may expect to receive complex-valued symbols for the remaining PDSCH REs based on RE mapping where 'PDSCH RE puncturing' is not applied and then perform decoding based thereon.

Figure 11:
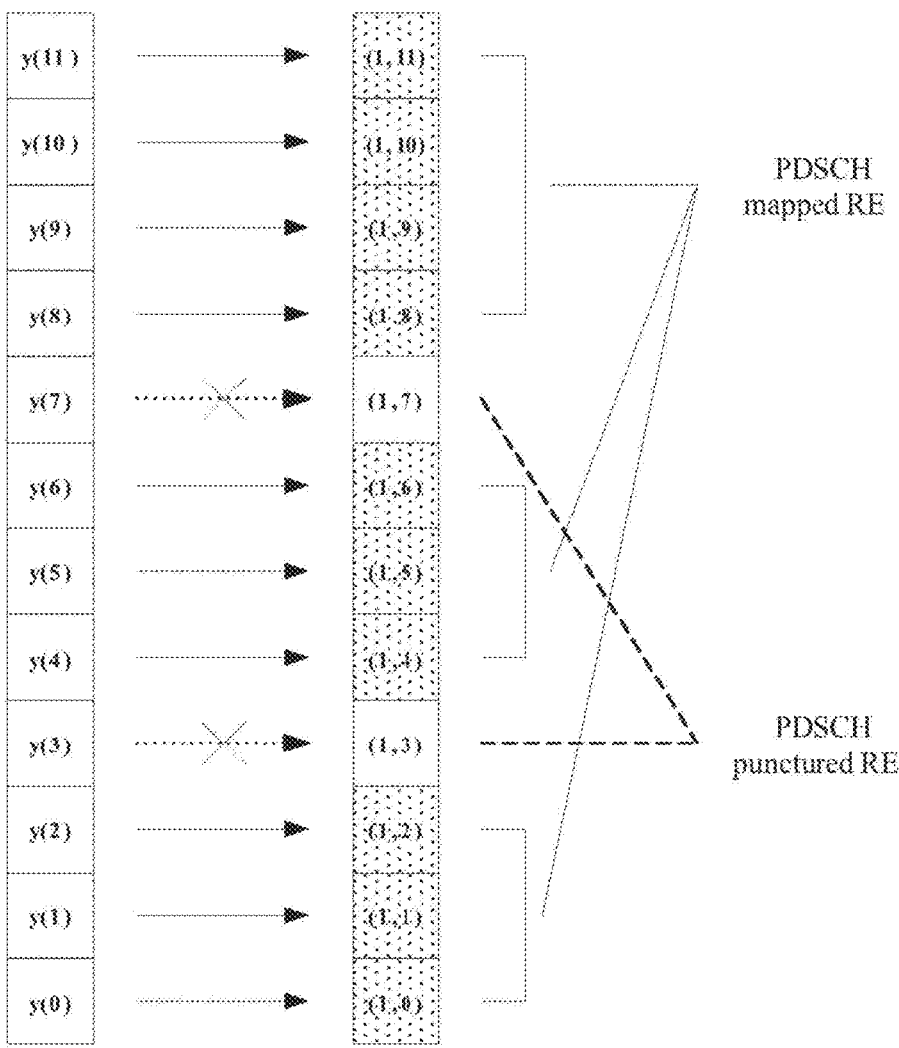
FIGS. 11 and 12 illustrate PDSCH mapping according to embodiments of the present disclosure.

FIG. 11 illustrates an example of 'PDSCH RE puncturing'. Referring to FIG. 11, y(0), . . . , y(11) represent complex-valued symbols (e.g., complex symbols obtained through modulation), and each of (1,0), . . . , (1, 11) represents (time-domain resource index, frequency-domain resource index) of an RE. 'PDSCH RE puncturing' is applied to the REs with indices of (1, 3) and (1, 7). The BS may omit RE mapping of complex-valued symbols that should be mapped to the REs with indices of (1, 3) and (1, 7), which are subject to the 'PDSCH RE puncturing'. The UE may not expect PDSCH RE mapping for the REs with indices of (1, 3) and (1, 7). The UE/BS may operate in the same way as the conventional RE mapping at the location of the remaining REs.

In cases where there is a common PDSCH to be received by non-I-RS_Cap UEs and I-RS_Cap UEs, the operation of 'PDSCH RE puncturing' in Proposal 1 has the following effects: i) the operation provides the I-RS_Cap UEs with an RE mapping rule between a scheduled PDSCH and a TRS/CSI-RS, thereby improving the PDSCH decoding performance of the UEs; ii) the operation ensures reception of the TRS/CSI-RS if possible; and iii) the operation provides a structure where the non-I-RS_Cap UEs are also capable of receiving the same PDSCH. For example, the non-I-RS_Cap UE may expect to receive a PDSCH without 'PDSCH RE puncturing' (for all REs, regardless of whether 'PDSCH RE puncturing' is actually applied). In fact, for REs where 'PDSCH RE puncturing' is not applied, complex-valued symbols are received according to the RE mapping rule for the non-I-RS_Cap UE.

Cond-A Related to Transmission/Reception of TRS/CSI-RS

Whether 'PDSCH RE puncturing' is applied may be determined based on Cond-A. For example, Cond-A may indicate whether the UE is capable of assuming TRS/CSI-RS transmission from the BS (or is capable of assuming TRS/CSI-RS reception). Specifically, 'PDSCH RE puncturing' may be configured to be performed only when the UE is capable of assuming TRS/CSI-RS transmission and reception on a TRS/CSI-RS occasion overlapping with a scheduled PDSCH. For example, it is assumed that there is information (hereinafter referred to as "A-indication") that indicates whether the TRS/CSI-RS transmission and reception are allowed on specific TRS/CSI-RS occasion(s). If a TRS/CSI-RS occasion where it is indicated by A-indication that TRS/CSI-RS reception is allowed overlaps with a PDSCH scheduled to the UE, the UE may assume that 'PDSCH RE puncturing' will be applied to the positions of overlapping TRS/CSI-RS REs. In this case, if the UE is incapable of assuming the TRS/CSI-RS reception on the TRS/CSI-RS occasion overlapping with the scheduled PDSCH, the UE may expect a PDSCH without 'PDSCH RE puncturing' (e.g., a PDSCH expected by the non-I-RS_Cap UE). For example, if the UE does not receive through A-indication an indication that the TRS/CSI-RS reception is allowed on the TRS/CSI-RS occasion overlapping with the scheduled PDSCH, the UE may be configured not to expect 'PDSCH RE puncturing' (regardless of whether the TRS/CSI-RS is actually transmitted).

If 'PDSCH RE puncturing' is performed depending on whether the UE is capable of assuming the TRS/CSI-RS reception (or depending on the information provided by A-indication), there is an advantage in that 'PDSCH RE puncturing' is allowed without additional signaling about puncturing.

Cond-A Based on P-Indication

For example, indication information (hereinafter referred to as P-indication) indicating 'PDSCH RE puncturing' may be defined. Specifically, only when the UE receives an instruction of 'PDSCH RE puncturing' through P-indication, 'PDSCH RE puncturing' may be configured to be applied to a TRS/CSI-RS occasion that overlaps with a scheduled PDSCH.

P-indication may indicate whether 'PDSCH RE puncturing' is applied to a specific TRS/CSI-RS occasion (or resource). For example, if there is P-indication related to a specific TRS/CSI-RS occasion, and if P-indication indicates 'PDSCH RE puncturing', the UE may assume that 'PDSCH RE puncturing' will be applied to a PDSCH overlapping with the specific TRS/CSI-RS occasion. When the UE does not receive P-indication related to the specific TRS/CSI-RS occasion, or when the UE receives P-indication and P-indication indicates that 'PDSCH RE puncturing' is incapable of being assumed, the UE may not expect 'PDSCH RE puncturing' even if the scheduled PDSCH overlaps with the specific TRS/CSI-RS occasion. This method has the advantage of instructing the operation of 'PDSCH RE puncturing' for multiple PDSCHs with a single indication when actual TRS/CSI-RS transmission occurs over a certain period of time.

P-indication may indicate 'PDSCH RE puncturing' for a scheduled PDSCH. For example, if P-indication related to the scheduled PDSCH indicates 'PDSCH RE puncturing', the UE may assume that 'PDSCH RE puncturing' will be applied to the positions of overlapping TRS/CSI-RS REs. If the UE does not receive P-indication or if received P-indication does not indicate 'PDSCH RE puncturing', the UE may not expect 'PDSCH RE puncturing' for the scheduled PDSCH. Since P-indication is provided independently for each scheduled PDSCH, 'PDSCH RE puncturing' may be indicated dynamically in situations where the transmission and reception state of the TRS/CSI-RS changes instantaneously.

In addition to the operation of controlling 'PDSCH RE puncturing' based on P-indication, information on whether the UE assumes TRS/CSI-RS transmission and reception may be further considered. Specifically, 'PDSCH RE puncturing' based on P-indication information proposed above may be performed only in cases where the TRS/CSI-RS transmission and reception are capable of being expected on a TRS/CSI-RS occasion (or in cases where A-indication indicates that the TRS/CSI-RS transmission and reception is allowed). For example, it is assumed that there are multiple TRS/CSI-RS resource configurations, the UE is capable of assuming the TRS/CSI-RS transmission and reception only for some TRS/CSI-RS resources (hereinafter TRS/CSI-RS resource set A), and the UE is incapable of assuming the TRS/CSI-RS transmission and reception for the remaining TRS/CSI-RS resources (hereinafter TRS/CSI-RS resource set B). In this case, the indication of 'PDSCH RE puncturing' by P-indication may be applied only to TRS/CSI-RS resource set A, and the indication may not be applied to TRS/CSI-RS resource set B. That is, the UE may not expect the operation of 'PDSCH RE puncturing' for TRS/CSI-RS resource set B.

When the UE performs 'PDSCH RE puncturing' for a TRS/CSI-RS occasion overlapping with a scheduled PDSCH based on P-indication, explicit control/signaling of 'PDSCH RE puncturing' may be enabled, thereby enhancing the scheduling flexibility of the BS. Additionally, the operation of 'PDSCH RE puncturing' may be controlled even in situations where the UE does not expect the availability of the TRS/CSI-RS.

The applicability of the methods proposed in Proposal 1 or specific method therefor may vary depending on the purpose or transmission mode of a PDSCH. To apply Proposal 1 based on the characteristics of the PDSCH, the methods in the following examples may be used. The following examples are examples where Proposal 1 is applied, and the features and functions proposed in the present disclosure are not limited thereto.
PDSCH Scheduled with SI-RNTI Proposal 1 may be applied to a PDSCH scheduled by DCI having a CRC scrambled with an SI-RNTI or a PDSCH where SI-RNTI-based scrambling sequence initialization is applied.

If the DCI having the CRC scrambled with the SI-RNTI schedules a PDSCH for transmitting and receiving an SI message other than SIB1 (i.e., if a system information indicator indicates a value of 1 in DCI format 1_0 with the CRC scrambled with the SI-RNTI), it may be determined that 'PDSCH RE puncturing' is applied to the PDSCH scheduled by the DCI according to Cond-A proposed above (i.e., based on whether the UE is capable of assuming TRS/CSI-RS reception and/or the information provided by P-indication). The reason for this is to allow the BS and UE to assume the transmission and reception of the TRS/CSI- RS at the locations of overlapping REs when the transmission of the TRS/CSI-RS has priority over the transmission of the SI message other than SIB1. Additionally, signals that I-RS_Cap UEs may expect to receive at the locations of the overlapping REs may be provided without ambiguity.

If the DCI having the CRC scrambled with the SI-RNTI schedules a PDSCH for transmitting and receiving SIB1 (i.e., if the system information indicator indicates a value of 0 in DCI format 1_0 with the CRC scrambled with the SI-RNTI), it may be determined that 'PDSCH RE puncturing' is not applied to the PDSCH scheduled by the DCI at all times. The reason for this is that since SIB1 provides system information necessary for the UE to operate in a corresponding cell by default, the transmission of SIB1 needs to be ensured at all times unlike other signals or channels.
PDSCH Scheduled with P-RNTI Proposal 1 may be applied to a PDSCH scheduled by DCI having a CRC scrambled with a P-RNTI or a PDSCH where P-RNTI-based scrambling sequence initialization is applied.

If the DCI having the CRC scrambled with the P-RNTI schedules a PDSCH for transmitting and receiving a paging message (i.e., if a short message indicator indicates a value of 01 or 11 in DCI format 1_0 with the CRC scrambled with the P-RNTI), it may be determined that 'PDSCH RE puncturing' is applied to the PDSCH scheduled by the DCI according to Cond-A proposed above (i.e., based on whether the UE is capable of assuming TRS/CSI-RS reception and/or the information provided by P-indication). The provision of the TRS/CSI-RS for idle/inactive mode UEs is being considered to improve the paging performance of the UEs, and therefore, ensuring the transmission of the TRS/CSI-RS has additional advantages in terms of power saving of the UEs.

In this case, if A-indication and/or P-indication are included in the DCI scrambled with the P-RNTI, the information in A-indication and/or P-indication may be configured to differ between different monitoring occasions (MOs) included in the same PO. If this method is applied, the applicability and form of 'PDSCH RE puncturing' may vary for different PDSCHs transmitted and received on the same PO. This may be considered to account for the fact that the arrangement of MOs included in a PO may span across consecutive slots, while the configuration of TRS/CSI-RS occasions may differ from the arrangement.
PDSCH Scheduled with RA-RNTI/MsgB-RNTI/TC-RNTI Proposal 1 may be applied to a PDSCH scheduled by DCI having a CRC scrambled with an RA-RNTI/MsgB-RNTI/TC-RNTI or a PDSCH where the RA-RNTI/MsgB-RNTI/TC-RNTI is used for scrambling sequence initialization.

If the DCI having the CRC scrambled with the RA-RNTI/MsgB-RNTI/TC-RNTI schedules a PDSCH for transmitting and receiving a paging message (i.e., DCI format 1_0 with the CRC scrambled with the RA-RNTI/MsgB-RNTI/TC-RNTI), it may be determined that 'PDSCH RE puncturing' is applied to the PDSCH scheduled by the DCI according to Cond-A proposed above (i.e., based on whether the UE is capable of assuming TRS/CSI-RS reception and/or the information provided by P-indication).

Proposal 1 may be applied to the PDSCH scheduled with the RA-RNTI/MsgB-RNTI/TC-RNTI only when the UE requests the BS to apply Proposal 1. For example, when the UE transmits a PRACH to perform a RACH, the UE may provide to the BS separate information indicating that the UE is capable of expecting the application of Proposal 1. The application of Proposal 1 may also be expected only in cases where the BS allocates resources such as a PRACH preamble or a RACH occasion (RO) separately for a UE with a specific capability and the UE perform RACH operations on the resources. Alternatively, after the UE transmits separate information indicating that the UE is capable of expecting the application of Proposal 1 over a UL data transmission channel such as MsgA or Msg3, the UE may expect that Proposal 2 will be applied to a PDSCH received during the RACH process.

Proposal 2: Configuration of PDSCH Availability for RE where TRS/CSI-RS is Transmitted In an embodiment of the present disclosure, there is provided a method of configuring the availability of a PDSCH, which is received by the I-RS_Cap UE in the idle/inactive mode, for TRS/CSI-RS REs. Specifically, when a TRS/CSI-RS occasion overlaps with a scheduled PDSCH, if specific conditions (hereinafter referred to as Cond-B) are satisfied, the UE may assume that TRS/CSI-RS REs configured for the TRS/CSI-RS occasion are not available for the PDSCH (referred to as 'TRS/CSI-RS RE's are not available for PDSCH').

In the present disclosure, the operation of 'TRS/CSI-RS REs are not available for PDSCH' may be defined as follows. If TRS/CSI-RS REs are designated as not available for a PDSCH, additional conditions regarding the locations of TRS/CSI-RS REs may be considered in addition to the existing conditions (i.e. conditions defined in TS38.214 s5.1.4) for determining REs not available for PDSCH transmission in the time/frequency resource region of a scheduled PDSCH. In this case, the REs capable of being assumed as not available are reflected in the calculation of available coded bits to be applied from rate matching onwards during a process of generating a PDSCH that the BS intends to transmit (e.g., A02 and subsequent steps in FIG. 10). In addition, during a step where the blocks of complex-valued symbols where antenna port mapping is applied are mapped to the REs of VRBs, no complex-valued symbols are mapped to the REs capable of being assumed as not available. Additionally, the REs are not included when counting complex-valued symbol indices (A08 and subsequent steps in FIG. 10). The UE may not expect to receive complex-valued symbols for the REs where 'TRS/CSI-RS REs are not available for PDSCH' is applied, and simultaneously, the UE may receive data by skipping counting complex-valued symbols at the location of the corresponding REs.

Figure 12:
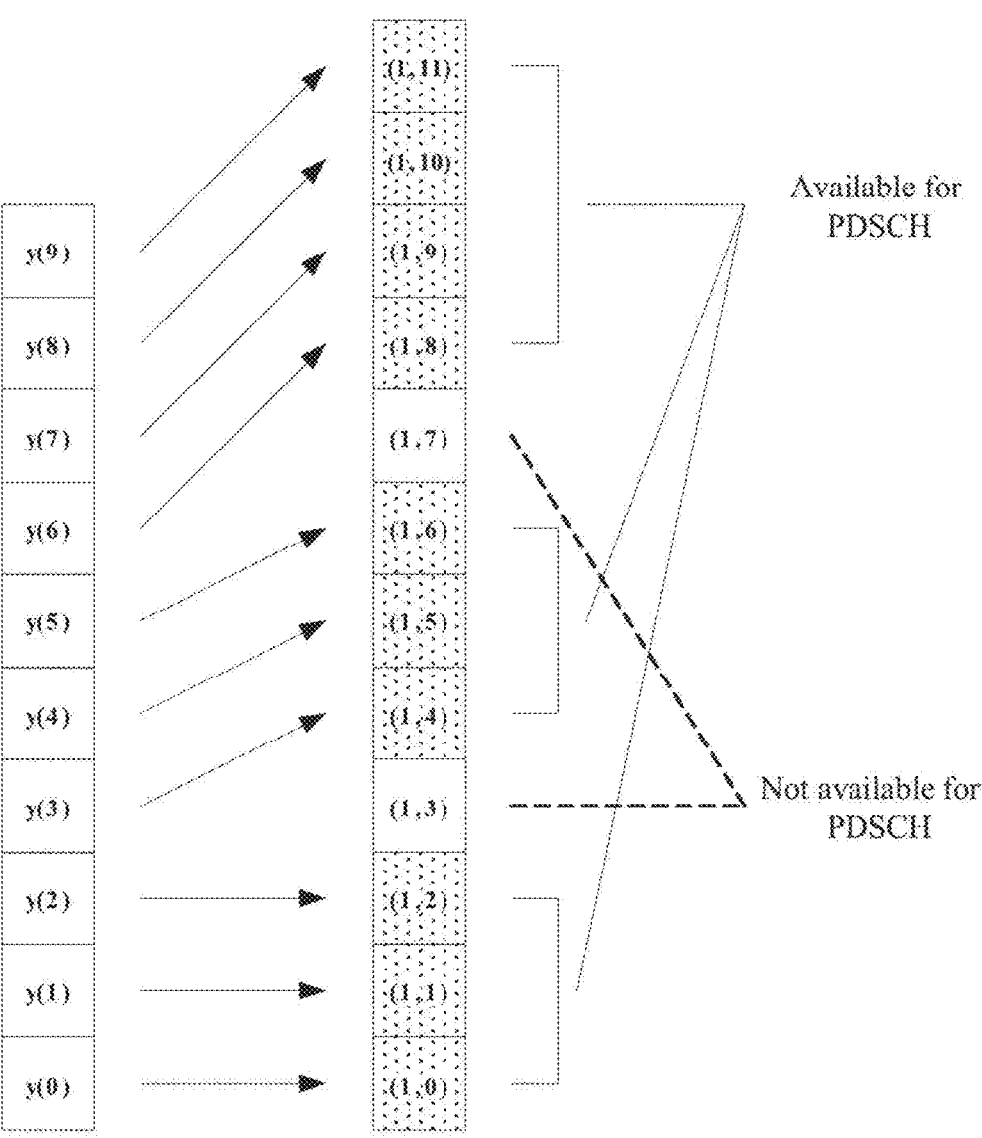

FIG. 12 illustrates an operation that considers REs designated as not available for a PDSCH. In the example of FIG. 12, y(0), . . . , y(9) represent complex-valued symbols, and each of (1,0), . . . , (1, 11) represents (time-domain resource index, frequency-domain resource index) of an RE. The REs with indices of (1, 3) and (1, 7) are designated as not available for the PDSCH. In this case, mapping of complex-valued symbols may be skipped at the location of the REs designated as not available for the PDSCH, and RE mapping of complex-valued symbols may be sequentially performed at the location of the remaining REs.

When the UE in the connected mode is instructed to perform the operation of 'TRS/CSI-RS REs are not available for PDSCH' proposed in Proposal 2, the UE may follow TRS/CSI-RS RE mapping. In this case, the impacts of the REs that are not available for the PDSCH are reflected at the rate matching stage. Thus, the operation of 'TRS/CSI-RS REs are not available for PDSCH' may easily manage the RV and expect higher channel decoding performance, compared to the operation of 'PDSCH RE puncturing'. However, if the operation of 'TRS/CSI-RS REs are not available for PDSCH' is applied to a common PDSCH expected to be received by non-I-RS_Cap UEs and I-RS_Cap UEs, the non-I-RS_Cap UEs are incapable of decoding data because the non-I-RS_Cap UEs misinterpret the complex-valued symbol indices of the corresponding PDSCH.

Method of Limiting PDSCH Scheduling to which Proposal 2 is Applied to I-RS_Cap UEs.

As described above, when Proposal 2 is applied to a PDSCH expected to be received by multiple UEs, in particular, when Proposal 2 is applied to a PDSCH scheduled for idle/inactive mode UEs, non-I-RS_Cap UEs may not receive the PDSCH. In addition, in order for the BS to schedule the PDSCH to which Proposal 2 applied, it may be necessary to distinguish I-RS_Cap UEs.

To address the issues described above, a common understanding between the BS and UE may be necessary regarding the applicability of Proposal 2, that is, to apply the operation of 'TRS/CSI-RS RE's are not available for PDSCH' proposed in Proposal 2. To this end, the UE needs to perform reporting to inform the BS (or higher nodes) at least once that the UE is capable of supporting Proposal 2. The UE may expect the application of Proposal 2 only if the UE receives acceptance from the BS (or higher node).

To address the issues described above, Proposal 2 may be applied only when resources separately designated for I-RS_Cap UEs are used. The separately designated resources may be resources on which non-I-RS_Cap UEs do not expect reception. As an example, Proposal 2 may be applied when a scheduled PDSCH, a separately designated DMRS for a PDSCH, and/or separately designated RNTI values are used as separately designated time/frequency resources. As another example, Proposal 2 may be applied to a separately designated CORESET, a search space (including a search space set or search space set group), and/or a PDSCH scheduled by DCI formats.

As a specific example, if reduced capability (RedCap) UEs, which are being discussed in Rel-17 NR, are introduced, and if separate time/frequency resources or control/data channels are used for the RedCap UEs in the idle/inactive mode, Proposal 2 may be applied to the PDSCH transmission and reception process for the RedCap UEs.

Cond-B Based on Whether UE Assumes TRS/CSI-RS Reception

Cond-B may be whether the UE is capable of assuming TRS/CSI-RS transmission or TRS/CSI-RS reception. Specifically, 'TRS/CSI-RS RE's are not available for PDSCH' may be configured to be applied only in cases where the UE is capable of assuming TRS/CSI-RS transmission and reception on a TRS/CSI-RS occasion that overlaps with a scheduled PDSCH. For example, if there is A-indication indicating whether the TRS/CSI-RS transmission and reception is allowed on a specific TRS/CSI-RS occasion, and if the TRS/CSI-RS occasion, where it is indicated by A-indication that the TRS/CSI-RS reception is capable of being assumed, overlaps with a scheduled PDSCH, the UE may assume that 'TRS/CSI-RS REs are not available for PDSCH' will be applied to overlapping TRS/CSI-RS REs. In this case, if the UE is incapable of assuming the TRS/CSI-RS reception on the TRS/CSI-RS occasion overlapping with the scheduled PDSCH, the UE may expect to receive a PDSCH where 'TRS/CSI-RS REs are not available for PDSCH' is not considered (e.g., a PDSCH expected by the non-I-RS_Cap UE). For example, when A-indication is present, but when the UE is not instructed by A-indication to assume the TRS/CSI-RS reception on the TRS/CSI-RS occasion that overlaps with the scheduled PDSCH, the UE may be configured not to expect 'TRS/CSI-RS RE's are not available for PDSCH' regardless of whether the TRS/CSI-RS is actually transmitted.

As in the method proposed above, if 'TRS/CSI-RS REs are not available for PDSCH' is performed depending on whether the UE is capable of assuming the TRS/CSI-RS reception on the TRS/CSI-RS occasion that overlaps with the scheduled PDSCH (or depending on the information provided by A-indication), there is an advantage in that the applicability of 'TRS/CSI-RS REs are not available for PDSCH' is provided without any additional signaling.

Cond-B Conditions Based on R-Indication

As Cond-B, indication information (hereinafter R-indication) indicating 'TRS/CSI-RS REs are not available for PDSCH' may be used. Specifically, only when 'TRS/CSI-RS REs are not available for PDSCH' is indicated through R-indication, 'TRS/CSI-RS REs are not available for PDSCH' may be applied to a TRS/CSI-RS occasion that overlaps with a scheduled PDSCH.

R-indication may indicate the operation of 'TRS/CSI-RS REs are not available for PDSCH' for TRS/CSI-RS occasions (or resources). For example, if there is R-indication related to a specific TRS/CSI-RS occasion, and if R-indication indicates 'TRS/CSI-RS REs are not available for PDSCH', the UE may assume that 'TRS/CSI-RS REs are not available for PDSCH' will be applied to the scheduled PDSCH that overlaps with the specific TRS/CSI-RS occasion. When the UE does not receive R-indication related to the specific TRS/CSI-RS occasion, or when the UE receives R-indication and R-indication indicates that 'TRS/CSI-RS REs are not available for PDSCH' is incapable of being assumed, the UE may be configured not to expect the configuration of 'TRS/CSI-RS REs are not available for PDSCH' at the location of specific TRS/CSI-RS REs even if the scheduled PDSCH overlaps with the specific TRS/CSI-RS occasion. This method has the advantage of instructing the operation of 'TRS/CSI-RS REs are not available for PDSCH' for multiple PDSCHs with a single indication when actual TRS/CSI-RS transmission occurs over a certain period of time.

Alternatively, R-indication may indicate 'TRS/CSI-RS REs are not available for PDSCH' for a scheduled PDSCH. For example, if there is R-indication related to a specific PDSCH scheduled to the UE, and if R-indication indicates 'TRS/CSI-RS REs are not available for PDSCH,' the UE may assume that 'TRS/CSI-RS RE's are not available for PDSCH' will be applied to TRS/CSI-RS REs that overlap with the scheduled PDSCH. When the UE does not receive R-indication related to the specific PDSCH, or when the UE receives R-indication and R-indication indicates that 'TRS/CSI-RS REs are not available for PDSCH' is incapable of being assumed, the UE may be configured not to expect 'TRS/CSI-RS REs are not available for PDSCH' for the specific scheduled PDSCH. Since R-indication is provided independently for each scheduled PDSCH, 'TRS/CSI-RS REs are not available for PDSCH' may be indicated dynamically in situations where the transmission and reception state of the TRS/CSI-RS changes instantaneously.

In addition to the operation of controlling 'TRS/CSI-RS REs are not available for PDSCH' based on R-indication, information on whether the TRS/CSI-RS transmission and reception is performed may be further considered. Specifically, 'TRS/CSI-RS REs are not available for PDSCH' based on the information provided by R-indication proposed above may be applied only in cases where the TRS/CSI-RS transmission and reception is capable of being expected on a TRS/CSI-RS occasion (or in cases where A-indication indicates that the TRS/CSI-RS transmission and reception is allowed). For example, it is assumed that there are multiple TRS/CSI-RS resource configurations, the UE is capable of assuming the TRS/CSI-RS transmission and reception only for some TRS/CSI-RS resources (hereinafter TRS/CSI-RS resource set A), and the UE is incapable of assuming the TRS/CSI-RS transmission and reception for the remaining TRS/CSI-RS resources (hereinafter TRS/CSI-RS resource set B). In this case, the indication of 'TRS/CSI-RS REs are not available for PDSCH' by R-indication may be applied only to TRS/CSI-RS resource set A, and the information provided by R-indication may not be applied to TRS/CSI-RS resource set B. In other words, the UE may be configured not to expect the operation of 'TRS/CSI-RS REs are not available for PDSCH' for TRS/CSI-RS resource set B.

If 'TRS/CSI-RS REs are not available for PDSCH' is performed depending on whether the UE is capable of assuming the TRS/CSI-RS reception on the TRS/CSI-RS occasion that overlaps with the scheduled PDSCH (or depending on the information provided by A-indication), there is an advantage in that the applicability of 'TRS/CSI-RS REs are not available for PDSCH' is provided without any additional signaling. As in the method proposed above, if the UE performs 'TRS/CSI-RS REs are not available for PDSCH' for a TRS/CSI-RS occasion that overlaps with a scheduled PDSCH based on information provided by R-indication, the applicability of 'TRS/CSI-RS RE's are not available for PDSCH' may be explicitly controlled, thereby enhancing the scheduling flexibility of the BS. Additionally, the operation of 'TRS/CSI-RS REs are not available for PDSCH' may be controlled even in situations where the UE does not expect the availability of the TRS/CSI-RS.

Application of 'TRS/CSI-RS REs are not Available for PDSCH' or 'PDSCH RE Puncturing' Depending on Conditions As mentioned above, the configuration method for 'TRS/CSI-RS REs are not available for PDSCH' has the advantage of improving encoding/decoding performance by controlling the number of coded bits capable of being transmitted in the rate matching stage, but the method has a disadvantage in that it is difficult to apply the method if a scheduled PDSCH is shared between the I-RS_Cap UE and non-I-RS_Cap UE. On the other hand, according to the method of 'PDSCH RE puncturing' proposed in Proposal 1, the non-I-RS_Cap UE may expect PDSCH decoding, regardless of whether the method is applied. The method may have relatively low encoding/decoding performance compared to the configuration of 'TRS/CSI-RS REs are not available for PDSCH'. Considering these characteristics, the present disclosure proposes a method of determining whether to apply Proposal 1 or Proposal 2 in an embodiment of the present disclosure.

To control the application of Proposal 1 and Proposal 2 depending on the situation, a separate indication (hereinafter Q-indication) may be used to indicate the method to be applied. In this case, Q-indication may include an indication for the application of 'TRS/CSI-RS REs are not available for PDSCH', which is the information provided by R-indication. Specifically, 'TRS/CSI-RS REs are not available for PDSCH' may be applied to a TRS/CSI-RS occasion that overlaps with a scheduled PDSCH only in cases where Q-indication indicates that the UE is capable of assuming the application of 'TRS/CSI-RS REs are not available for PDSCH'. The detailed operations may be the same as the operations when 'TRS/CSI-RS REs are not available for PDSCH' is applied by R-indication.

If Q-indication indicates that 'TRS/CSI-RS RE's are not available for PDSCH' is incapable of being assumed, the I-RS_Cap UE may assume that 'PDSCH RE puncturing' is applied to TRS/CSI-RS REs configured on the TRS/CSI-RS occasion that overlaps with the scheduled PDSCH. In other words, only when the application of 'TRS/CSI-RS REs are not available for PDSCH' is appropriate, the UE may perform the corresponding operation to transmit and receive the PDSCH. Otherwise, the UE may apply the operation of 'PDSCH RE puncturing' and make appropriate assumptions for the PDSCH reception.

In particular, TRS/CSI-RS REs for which the operation of 'TRS/CSI-RS REs are not available for PDSCH' or the operation of 'PDSCH RE puncturing' is selected by Q-indication may be limited only to TRS/CSI-RS resources where the UE is capable of assuming the actual TRS/CSI-RS transmission and reception (i.e., resources where it is indicated by A-indication that the TRS/CSI-RS transmission and reception is capable of being assumed). If the UE is incapable of assuming the availability of a specific TRS/CSI-RS resource on the TRS/CSI-RS occasion that overlaps with the scheduled PDSCH, the UE may assume that mapping of complex-valued symbols to VRB REs is performed at the locations of REs included in the TRS/CSI-RS resource. In this case, if multiple TRS/CSI-RS resources are configured at the location of the TRS/CSI-RS occasion that overlaps with the scheduled PDSCH, and if the assumption of availability is indicated only for some of the TRS/CSI-RS resources, the UE may be configured to assume the application of 'TRS/CSI-RS REs are not available for PDSCH' or 'PDSCH RE', which is determined based on the information provided by Q-indication, only for TRS/CSI-RS REs where the availability of the TRS/CSI-RS transmission and reception is assumed. In addition, the UE may be configured to always assume available RE (i.e. REs where mapping of complex-valued symbols is performed) at the locations of TRS/CSI-RS REs where the availability of the TRS/CSI-RS transmission and reception is incapable of being assumed, regardless of Q-indication.

The applicability of the methods proposed in Proposal 2 or specific method therefor may vary depending on the purpose or transmission mode of a PDSCH. To apply Proposal 2 based on the characteristics of the PDSCH, the methods in the following examples may be used. The following examples are examples where Proposal 2 is applied, and the features and functions proposed in the present disclosure are not limited thereto.

PDSCH Scheduled with SI-RNTI

Proposal 2 may be applied to a PDSCH scheduled by DCI having a CRC scrambled with an SI-RNTI or a PDSCH where the SI-RNTI is used for scrambling sequence initialization.

If the DCI having the CRC scrambled with the SI-RNTI schedules a PDSCH for transmitting and receiving an SI message other than SIB1 (i.e., if the system information indicator indicates a value of 1 in DCI format 1_0 with the CRC scrambled with the SI-RNTI), it may be determined that 'TRS/CSI-RS RE's are not available for PDSCH' is applied to the PDSCH scheduled by the DCI according to Cond-B proposed above (i.e., based on whether the UE is capable of assuming TRS/CSI-RS reception and/or the information provided by R-indication (or Q-indication)). In this case, the application of 'TRS/CSI-RS REs are not available for PDSCH' may be limited to cases where a separately configured SIB is scheduled for a specific UE with the following characteristics: I-RS_Cap. As an example, the proposed method may be applied when an SIB for only RedCap UEs discussed in the Rel-17 NR RedCap item is transmitted. As another example, if the I-RS_Cap UE requests the SIB during a process of transmitting and receiving the SIB on demand, the proposed method may be applied. In this case, if the UE expects the application of Proposal 2, the UE may be configured to request the application of Proposal 2 (e.g., using Msg1, Msg3, etc.) during the process of requesting the SIB on demand. In other cases, that is, if the UE is incapable of assuming the application of 'TRS/CSI-RS REs are not available for PDSCH', the UE may be configured to determine whether to apply 'PDSCH RE puncturing' according to Cond-A.

If the DCI having the CRC scrambled with the SI-RNTI schedules a PDSCH for transmitting and receiving SIB1 (i.e., if the system information indicator indicates a value of 0 in DCI format 1_0 with the CRC scrambled with the SI-RNTI), it may be determined that 'TRS/CSI-RS REs are not available for PDSCH' is not applied to the PDSCH scheduled by the DCI at all times. The reason for this is that since SIB1 provides system information necessary for the UE to operate in a corresponding cell by default, the transmission of SIB1 needs to be ensured at all times unlike other signals or channels.

PDSCH scheduled with P-RNTI

Proposal 2 may be applied to a PDSCH scheduled by DCI having a CRC scrambled with a P-RNTI or a PDSCH where the P-RNTI is used for scrambling sequence initialization.

If the DCI having the CRC scrambled with the P-RNTI schedules a PDSCH for transmitting and receiving a paging message (i.e., if the short message indicator indicates a value of 01 or 11 in DCI format 1_0 with the CRC scrambled with the P-RNTI), it may be determined that 'TRS/CSI-RS RE's are not available for PDSCH' is applied to the PDSCH scheduled by the DCI according to Cond-B proposed above (i.e., based on whether the UE is capable of assuming TRS/CSI-RS reception and/or the information provided by R-indication (or Q-indication)). If the UE is incapable of assuming 'TRS/CSI-RS REs are not available for PDSCH' according to Cond-B, the UE may be configured to determine whether to apply 'PDSCH RE puncturing' according to Cond-A.

In this case, if A-indication and/or R-indication are included in the DCI scrambled with the P-RNTI, the information in A-indication and/or R-indication may be configured to differ between different MOs included in the same PO. If this method is applied, the applicability and form of 'PDSCH RE puncturing' may vary for different PDSCHs transmitted and received on the same PO. This may be considered to account for the fact that the arrangement of MOs included in a PO may span across consecutive slots, while the configuration of TRS/CSI-RS occasions may differ from the arrangement.

PDSCH Scheduled with RA-RNTI/MsgB-RNTI/TC-RNTI

Proposal 2 may be applied to a PDSCH scheduled by DCI having a CRC scrambled with an RA-RNTI/MsgB-RNTI/TC-RNTI or a PDSCH where the RA-RNTI/MsgB-RNTI/TC-RNTI is used for scrambling sequence initialization.

If the DCI having the CRC scrambled with the RA-RNTI/MsgB-RNTI/TC-RNTI schedules a PDSCH for transmitting and receiving a paging message (i.e., DCI format 1_0 with the CRC scrambled with the RA-RNTI/MsgB-RNTI/TC-RNTI), it may be determined that 'PDSCH RE puncturing' is applied to the PDSCH scheduled by the DCI according to Cond-B proposed above (i.e., based on whether the UE is capable of assuming TRS/CSI-RS reception and/or the information provided by R-indication (or Q-indication)). If the UE is incapable of assuming 'TRS/CSI-RS REs are not available for PDSCH' according to Cond-B, the UE may be configured to determine whether to apply 'PDSCH RE puncturing' according to Cond-A.

Proposal 2 may be applied to the PDSCH scheduled with the RA-RNTI/MsgB-RNTI/TC-RNTI only when the UE requests the BS to apply Proposal 2. For example, when the UE transmits a PRACH to perform a RACH, the UE may provide to the BS separate information indicating that the UE is capable of expecting the application of Proposal 2. The application of Proposal 2 may also be expected only in cases where the BS allocates resources such as a PRACH preamble or an RO separately for a UE with a specific capability and the UE perform RACH operations on the resources. Alternatively, after the UE transmits separate information indicating that the UE is capable of expecting the application of Proposal 2 over a UL data transmission channel such as MsgA or Msg3, the UE may expect that Proposal 2 will be applied to a PDSCH received during the RACH process.

Proposal 3: Configuration and Indication of Cond-A/Cond-B

The present disclosure proposes a method of configuring and indicating Cond-A and Cond-B, which are related to Proposal 1 and Proposal 2, respectively. Specifically, the configuration and indication method may include a method for the BS to configure and indicate A-indication, P-indication, R-indication, and/or Q-indication. For convenience of description, Proposal X is defined/used as a term encompassing Proposal 1 and Proposal 2, Cond-X is defined/used as a term encompassing Cond-A and Cond-B, and X-indication is defined/used as a term encompassing A-indication, P-indication, R-indication, and Q-indication.

The applicability of Proposal X may be provided to the UE in a higher layer signal transmitted from the BS. For example, the higher layer signal may be system information such as an SIB that the UE may acquire in the idle/inactive mode. To this end, the BS may transmit a message informing whether Proposal X is applied in the SIB. Upon obtaining the corresponding SIB, the UE may assume that the UE is capable of receiving a PDSCH to which Proposal X is applied.

The higher layer signal indicating whether to apply Proposal X may include configuration information on Cond-X. Specifically, the information on Cond-X may include information indicating which of Cond-A or Cond-B is to be applied and information on whether X-indication is used. When the X-indication information is provided in the higher layer signal, the UE may expect that Proposal X will be applied for a prescribed period of time according to Cond-X after acquisition of the SIB. The prescribed period of time may be determined to extend until after acquisition of the SIB indicating that the application of Proposal X is released. More specifically, if the UE acquires the release message during a specific modification period, the UE may assume that Proposal X will not be applied from the next modification period onward.

X-indication may be dynamically indicated by DCI. For example, if X-indication is included in DCI scheduling a PDSCH, X-indication may indicate the application of Cond-X to the PDSCH scheduled by the same DCI. To ensure compatibility with the non-I-RS_Cap UE capable of receiving the PDSCH scheduled by the same DCI in a CSS, X-indication may be configured with a bit area that the non-I-RS_Cap UE assumes as reserved bits within the corresponding DCI.

X-indication may be indicated dynamically using an RNTI. For example, the RNTI may be an RNTI used for CRC scrambling during the DCI encoding process. The RNTI may also be an RNTI for scrambling initialization of a PDSCH. Specifically, when a PDCCH and PDSCH are transmitted and received based on an RNTI expected by the legacy UE (e.g., non-I-RS_Cap UE), Cond-X may be defined such that the UE is incapable of assuming 'TRS/CSI-RS REs are not available for PDSCH' (or 'PDSCH RE puncturing'). On the other hand, in the case of an RNTI that the I-RS_Cap UE may expect but the legacy UE may not expect, Cond-X may be defined such that the UE is capable of assuming 'TRS/CSI-RS REs are not available for PDSCH' (or 'PDSCH RE puncturing').

As another example of providing X-indication using an RNTI, when a PDCCH and PDSCH are transmitted and received based on an RNTI expected by the legacy UE (e.g., non-I-RS_Cap UE), the UE may apply Proposal 1 according to Cond-A and assume the application of 'PDSCH RE puncturing' depending on the situation. On the other hand, in the case of an RNTI that the I-RS_Cap UE may expect but the legacy UE may not expect, the UE may apply Proposal 2 according to Cond-B and assume the application of 'TRS/CSI-RS REs are not available for PDSCH' depending on the situation. Therefore, in the case of PDSCH transmission and reception that may be shared with the non-I-RS_Cap UE, it is possible to allow PDSCH reception for the non-I-RS_Cap UEs while indicating accurate RE mapping rules for the I-RS_Cap UEs. In the case of PDSCH transmission and reception only for the I-RS_Cap UE, the PDSCH decoding performance of the I-RS_Cap UE may be improved while preventing the PDSCH reception of the non-I-RS_Cap UE.

Proposal 4: Multi Beam Operation

PDSCH and TRS/CSI-RS Transmission and Reception in Consideration of QCL Assumption When the BS transmits multiple signals and/or channels on the same time-domain resource in different beam directions using multiple panels, the UE may assume that the UE will perform reception by selecting one of the different beam directions. The reason for this is to ensure reception performance for multiple beams for a UE that support only a single panel. Similarly, for a TRS/CSI-RS, if TCI states (or QCL assumptions with SSBs) are configured for multiple beams, and if transmission and reception of the TRS/CSI-RS overlap with the transmission and reception of a scheduled PDSCH in the time domain, the UE needs to select the beam direction and the signal or channel where the UE is capable of assuming reception.

To this end, it may be assumed that a specific TRS/CSI-RS is transmitted and received on a TRS/CSI-RS occasion. The UE may assume that the UE is capable of receiving the specific TRS/CSI-RS only in cases where the same QCL assumption is applied to both the specific TRS/CSI-RS resource and the scheduled PDSCH. Additionally, the UE may assume that the UE is capable of receiving the scheduled PDSCH together at the same time. If the transmission and reception of the TRS/CSI-RS and the transmission and reception of the scheduled PDSCH satisfy the same QCL relationship, the UE may assume that the TRS/CSI-RS and scheduled PDSCH are transmitted in the same beam direction (or using the same panel). The UE may simultaneously receive the TRS/CSI-RS and PDSCH, thereby improving the performance of PDSCH decoding.

On the other hand, if the TRS/CSI-RS occasion overlaps with the scheduled PDSCH, and if the specific TRS/CSI-RS resource capable of being transmitted and received on the TRS/CSI-RS occasion has a different QCL assumption from that of the scheduled PDSCH, the UE may be allowed to receive only the scheduled PDSCH without transmitting and receiving the TRS/CSI-RS on the specific TRS/CSI-RS resource. If the PDSCH is not a common channel transmitted to both the I-RS_Cap UE and non-I-RS_Cap UE, stable PDSCH transmission may be ensured, regardless of the capability or type of the UE.

Configuration of Puncturing or Unavailable RE Using QCL Assumption

Hereinafter, a method of applying Proposal ½ by considering the QCL relationship between a TRS/CSI-RS resource and a scheduled PDSCH will be described.

According to the proposed method, if a TRS/CSI-RS resource having the same QCL assumption as that of a scheduled PDSCH is configured on a TRS/CSI-RS occasion that overlaps with the scheduled PDSCH, Proposal ½ may be applied to the corresponding TRS/CSI-RS resource. On the other hand, even though the TRS/CSI-RS resource is configured on the TRS/CSI-RS occasion overlapping with the scheduled PDSCH, Proposal ½ may not be applied to the corresponding TRS/CSI-RS resource if the same QCL assumption is not allowed for the scheduled PDSCH. In other words, even if a scheduled PDSCH overlaps with a TRS/CSI-RS resource having a different QCL assumption, the UE may not assume the application of 'PDSCH RE puncturing' or 'TRS/CSI-RS RE's are not available for PDSCH'. The UE may assume that mapping of complex-valued symbols to VRB REs is performed at the location of the corresponding REs.

According to the proposed method, in the case of a TRS/CSI-RS having a different QCL assumption from that of a scheduled PDSCH, interference to the scheduled PDSCH may be relatively small even if the TRS/CSI-RS is transmitted. In consideration of these characteristics, the BS may reduce degradation in PDSCH decoding performance that may occur when the application of 'PDSCH RE puncturing' or 'TRS/CSI-RS REs are not available for PDSCH' are assumed while ensuring the transmission of the TRS/CSI-RS. Furthermore, if the assumption about the TRS/CSI-RS availability is provided only for a TRS/CSI-RS resource having the same QCL relationship as the scheduled PDSCH, the UE may assume the application of Proposal ½ for REs in the same QCL assumptions, which is provided to the UE, based on the received information. However, the UE may make no assumptions for TRS/CSI-RS REs in different QCL assumptions, which are not provided to the UE.

Puncturing on TRS/CSI-RS Resource Group Basis or Configuration of Unavailable REs According to the proposed method, when one or more TRS/CSI-RS resources are configured within a cell, TRS/CSI-RS resource groups each of which including at least one TRS/CSI-RS resources may be configured, and Proposal ½ may be applied for each of the TRS/CSI-RS resource groups.

Specifically, if specific TRS/CSI-RS resources belonging to a TRS/CSI-RS resource group satisfy the same QCL relationship for a scheduled PDSCH, it may be determined that for the corresponding scheduled PDSCH, Proposal ½ is to be applied to all TRS/CSI-RS resources belonging to the corresponding TRS/CSI-RS resource group. On the other hand, if all TRS/CSI-RS resources belonging to the TRS/CSI-RS resource group do not satisfy the same QCL relationship for the scheduled PDSCH, it may be determined that Proposal ½ is not applied to all TRS/CSI-RS resources belonging to the corresponding TRS/CSI-RS resource group. If a specific TRS/CSI-RS resource is configured to belong to multiple TRS/CSI-RS resource groups, and if Proposal ½ is allowed to be applied to at least one of the multiple TRS/CSI-RS resource groups, Proposal ½ may also be applied to the corresponding TRS/CSI-RS resource. On the other hand, if Proposal ½ is not allowed to be applied to all TRS/CSI-RS resource groups to which the specific TRS/CSI-RS resource belongs, the corresponding TRS/CSI-RS resource may be determined to be excluded from the application of Proposal ½.

As another example, the application of Proposal ½ to TRS/CSI-RS resource groups may be indicated by the BS on a group basis. If the BS instructs the application of Proposal ½ to a specific TRS/CSI-RS resource group for a specific scheduled PDSCH, the UE may assume that Proposal ½ will be applied to all TRS/CSI-RS resources belonging to the specific TRS/CSI-RS resource group for the scheduled PDSCH.

Although different beam directions have different QCL relationships, interference may occur if a PDSCH and TRS/CSI-RS are transmitted simultaneously in the same RE due to the correlation characteristics between the beams. According to this embodiment, the following assumption: 'PDSCH RE puncturing' or 'TRS/CSI-RS REs are not available for PDSCH' may be applied to the beams where the impact of such interference is expected to be large, and thus, the BS does not need to transmit a PDSCH RE in the corresponding RE.

Figure 13:
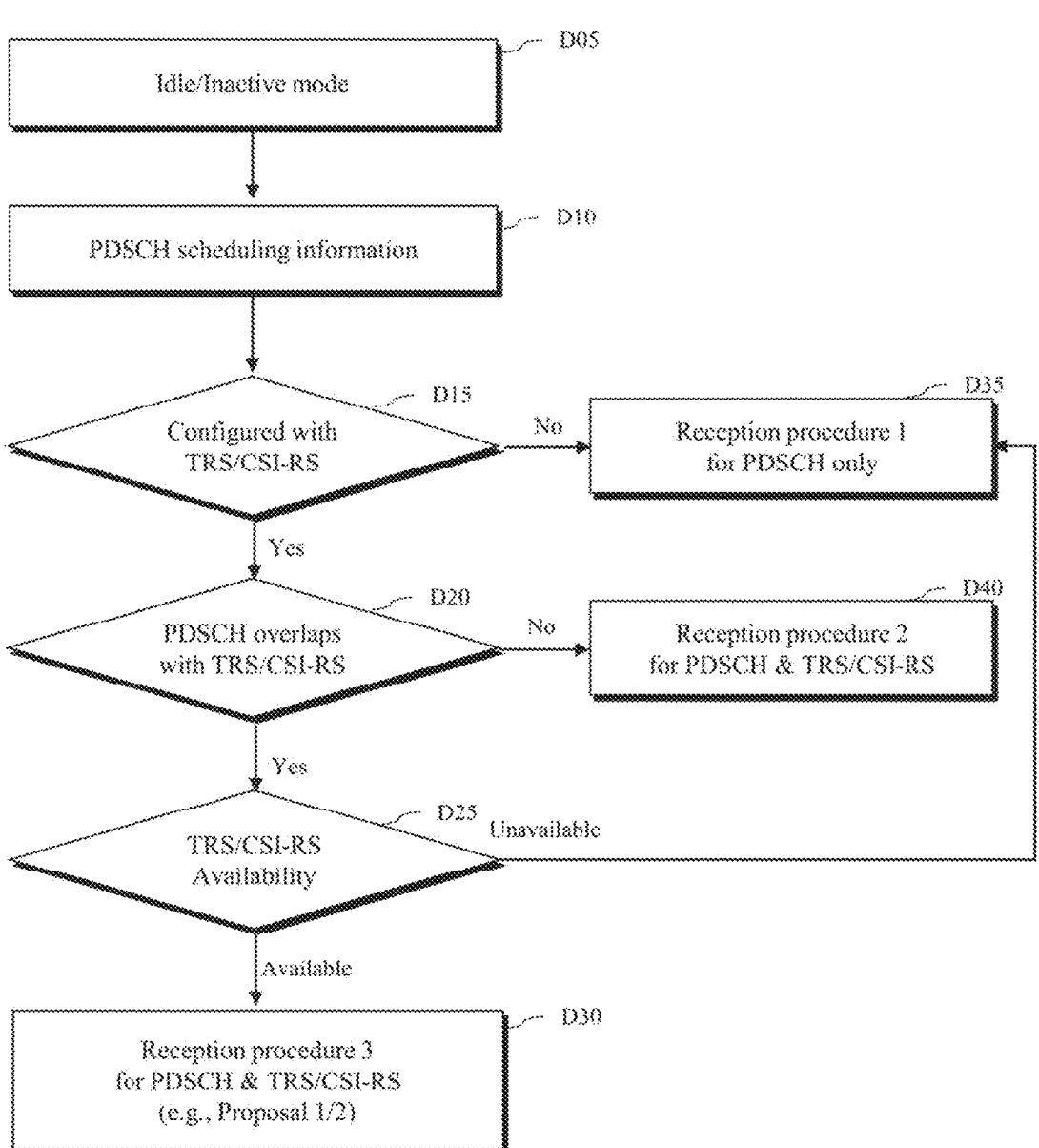
FIG. 13 is a diagram for explaining signal transmission and reception in an idle/inactive mode according to an embodiment of the present disclosure

FIG. 13 is a diagram for explaining signal transmission and reception in the idle/inactive mode according to an embodiment of the present disclosure. FIG. 13 may be understood as an implementation example for at least some of the above-described embodiments, and the above description may be referred to as needed.

The UE may enter the idle/inactive mode for power saving (D05).

The UE may receive information (e.g., DCI) scheduling a PDSCH in the idle/inactive mode (D10). The information scheduling the PDSCH includes information on a PDSCH resource. The DCI may be received over a PDCCH with a CRC scrambled with an RNTI as described above.

As a preparation process for the PDSCH, the UE may check whether the PDSCH resource does not collide with other signals. For example, the UE may be configured with a TRS/CSI-RS related to the idle/inactive mode. In this case, the TRS/CSI-RS (periodically transmitted) may potentially overlap with the PDSCH at least partially.

If the UE is configured with no TRS/CSI-RS (No in D15), the UE may perform a first reception process to receive the PDSCH (D35). The first reception process is to receive the PDSCH without consideration of the TRS/CSI-RS, that is, the first reception process is a process of receiving only the PDSCH without TRS/CSI-RS reception. The first reception process may be similar to that performed by the Rel-16 NR UE.

If the UE is configured with the TRS/CSI-RS (Yes in D15), the UE may perform different operations depending on whether the TRS/CSI-RS overlap with the PDSCH (D20). If the TRS/CSI-RS overlap with the PDSCH (No in D20), the UE may perform a second reception process (D40). The second reception process may be a process of separately receiving the PDSCH and TRS/CSI-RS, which do not overlap with each other (for example, if the TRS/CSI-RS is activated).

If the TRS/CSI-RS overlap with the PDSCH (Yes in D20), the UE may perform different operations depending on TRS/CSI-RS availability (D25). The TRS/CSI-RS availability may be determined based on at least one of Cond-A or Cond-B described above.

If the TRS/CSI-RS is unavailable, the UE may perform the first reception process by assuming that the TRS/CSI-RS is not mapped to overlapping REs (D35).

If the TRS/CSI-RS is available, the UE may perform a third reception process by assuming that the TRS/CSI-RS is mapped to overlapping REs (D30). The third reception process is a process of receiving both the PDSCH and TRS/CSI-RS that overlap with each other, which may be related to at least one of Proposal 1 or Proposal 2 described above.

In the above embodiment, the TRS/CSI-RS is provided to improve time/frequency synchronization performance in the inactive/idle mode. If the TRS/CSI-RS is available and overlaps with the PDSCH in the inactive/idle mode, it may be understood that the TRS/CSI-RS takes precedence.

In the above embodiment, backward compatibility is ensured, and thus, a common PDSCH may be provided to UEs with the capability to receive the TRS/CSI-RS related to the idle/inactive mode and UEs without the capability to the TRS/CSI-RS related to the idle/inactive mode.

Figure 14:
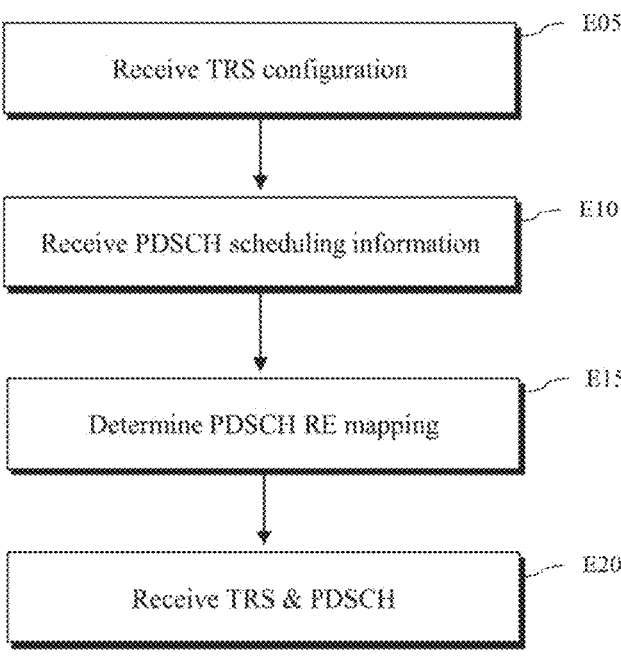
FIG. 14 illustrates a flow of a method for a UE to receive a signal in an idle/inactive mode according to an embodi-ment of the present disclosure.

FIG. 14 illustrates a flow of a method for the UE to receive a signal in the idle/inactive mode according to an embodiment of the present disclosure. FIG. 14 may be understood as an implementation example for at least some of the above-described embodiments, and the above description may be referred to as needed.

The UE may receive TRS configuration information related to an RRC Idle/Inactive state (E05).

The UE may receive PDSCH scheduling information in the RRC Idle/Inactive state (E10).

The UE may determine PDSCH resource mapping based on the PDSCH scheduling information (E15).

The UE may receive a PDSCH and a TRS in the RRC Idle/Inactive state based on the determined PDSCH resource mapping and the TRS configuration information (E20).

Based on i) that TRS resources related to the TRS configuration information overlap at least partially with PDSCH resources related to the PDSCH scheduling information and ii) that TRS availability information indicates that the TRS can be actually received, the UE may determine the PDSCH resource mapping by assuming that the PDSCH is punctured on resources where the PDSCH and the TRS overlap.

The UE may determine the PDSCH resource mapping by assuming that the PDSCH is punctured on the overlapping resources on a RE basis.

The UE may receive the TRS by assuming that the PDSCH is punctured on the overlapping resources.

The TRS availability information may be received from the BS through higher layer signaling.

Based on that the PDSCH is related to scrambling sequence initialization based on a specific RNTI or that a CRC of a PDCCH carrying the PDSCH scheduling information is scrambled with the specific RNTI, the UE may assume that the PDSCH is punctured on the overlapping resources.

The specific RNTI may include any one of a P-RNTI, an RA-RNTI, an MsgB-RNTI, or a TC-RNTI.

The UE may assume that although each of the overlapping resources is counted as a complex symbol of the PDSCH, the PDSCH is not actually mapped to the overlapping resources.

Figure 15:
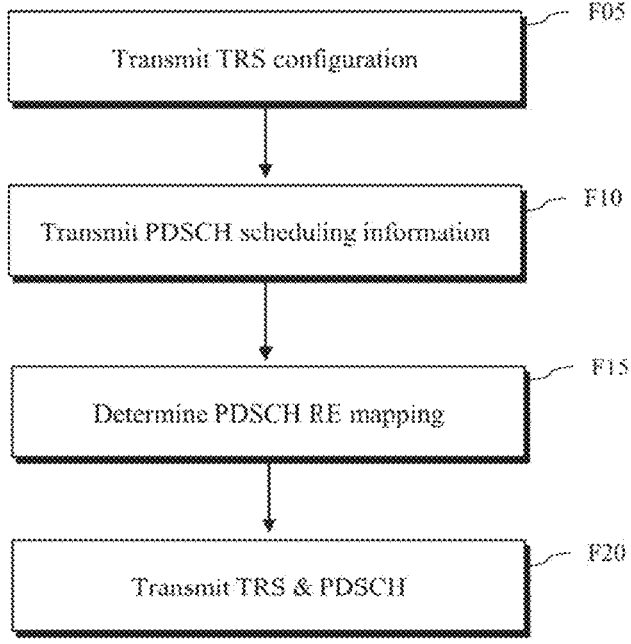
FIG. 15 illustrates a flow of a method for a BS to transmit a signal during an idle/inactive mode according to an embodiment of the present disclosure.

FIG. 15 illustrates a flow of a method for the BS to transmit a signal during the idle/inactive mode according to an embodiment of the present disclosure. FIG. 15 may be understood as an implementation example for at least some of the above-described embodiments, and the above description may be referred to as needed.

The BS may transmit TRS configuration information related to an RRC Idle/Inactive state of the UE (F05).

The BS may transmit PDSCH scheduling information while the UE is in the RRC Idle/Inactive state (F10).

The BS may determine PDSCH resource mapping based on the PDSCH scheduling information (F15).

The BS may transmit a PDSCH and a TRS based on the determined PDSCH resource mapping and the TRS configuration information while the UE is in the RRC Idle/Inactive state (F20).

Based on i) that TRS resources related to the TRS configuration information overlap at least partially with PDSCH resources related to the PDSCH scheduling information and ii) that TRS availability information indicates that the TRS can be actually received, the BS may puncture the PDSCH on resources where the PDSCH and the TRS overlap in determining the PDSCH resource mapping.

The PDSCH may be punctured on the overlapping resources on a RE basis.

The BS may puncture the PDSCH on the overlapping resources and transmit the TRS on the overlapping resources.

The BS may transmit the TRS availability information through higher layer signaling.

Based on that the PDSCH is related to scrambling sequence initialization based on a specific RNTI or that a CRC of a PDCCH carrying the PDSCH scheduling information is scrambled with the specific RNTI, the BS may puncture the PDSCH on the overlapping resources.

The specific RNTI may include any one of a P-RNTI, an RA-RNTI, an MsgB-RNTI, or a TC-RNTI.

The BS may count each of the overlapping resources as a complex symbol of the PDSCH but may not actually map the PDSCH to the overlapping resources.

Figure 16:
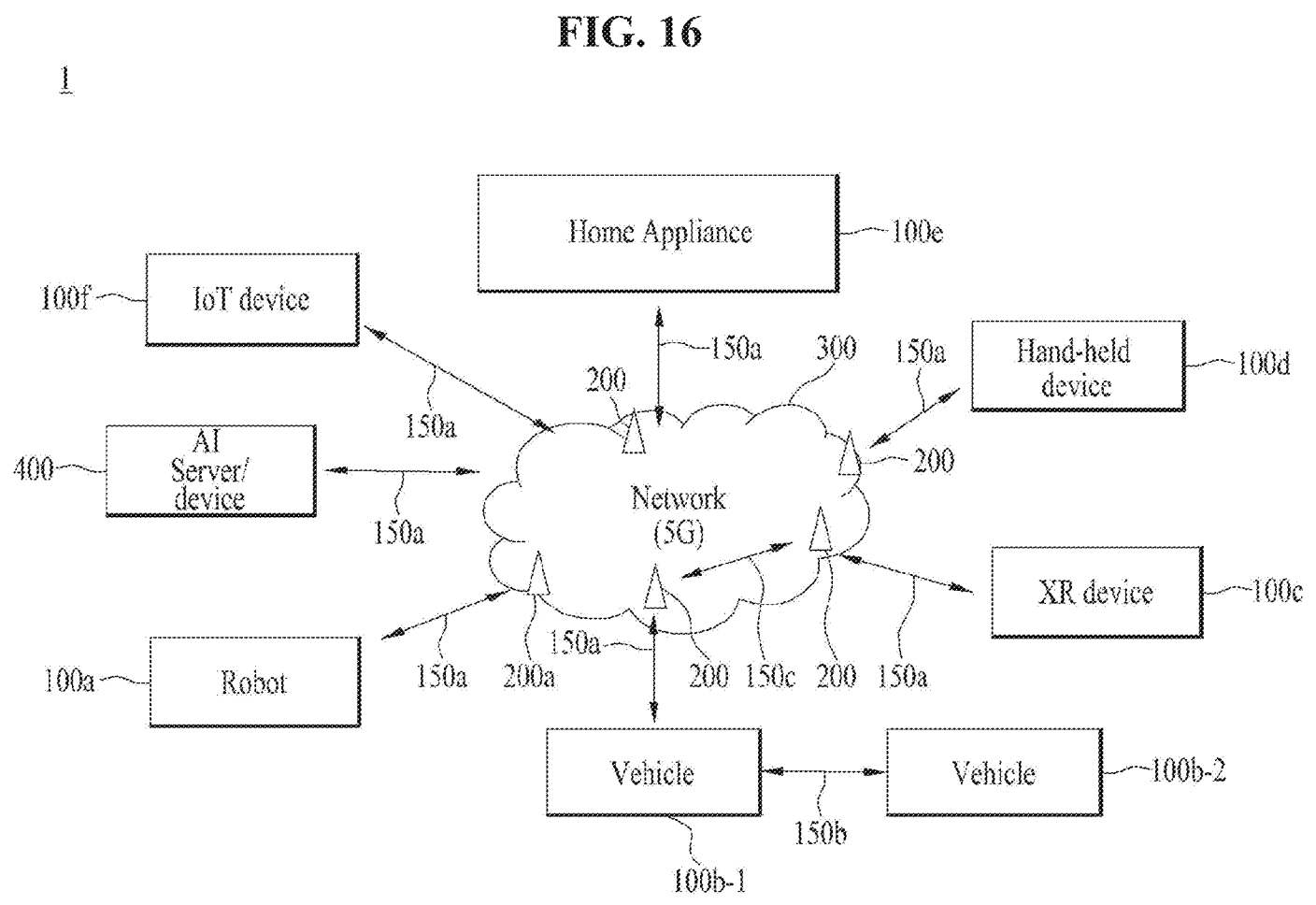

FIG. 16 illustrates a communication system 1 applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IOT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/ network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
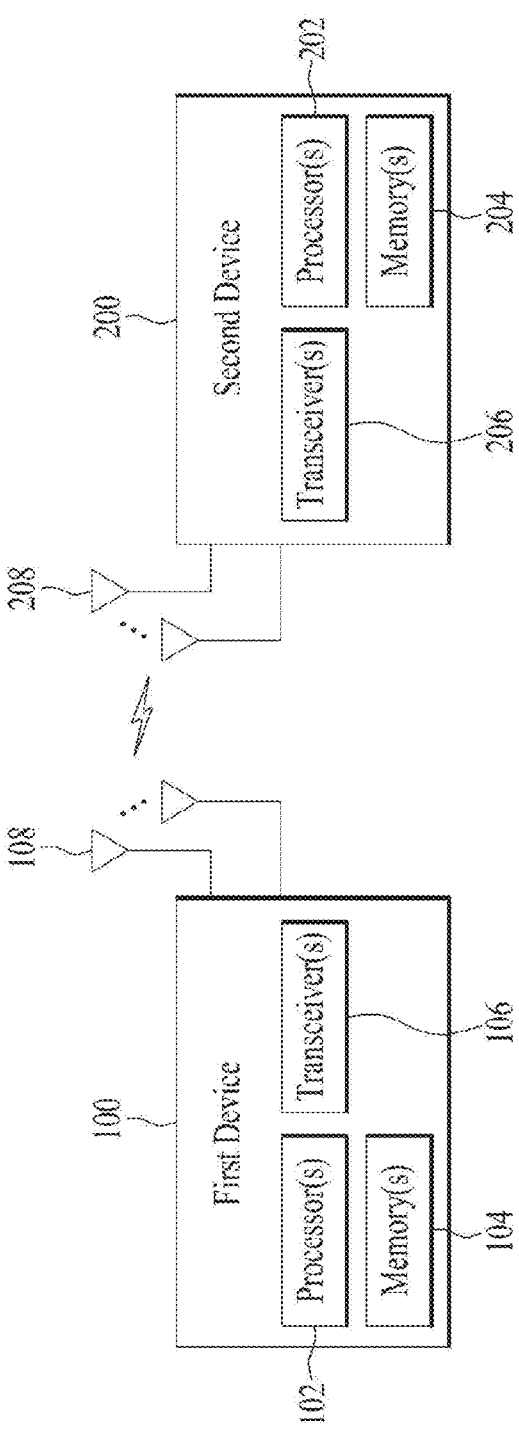

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document.

Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In an embodiment of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In an embodiment of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
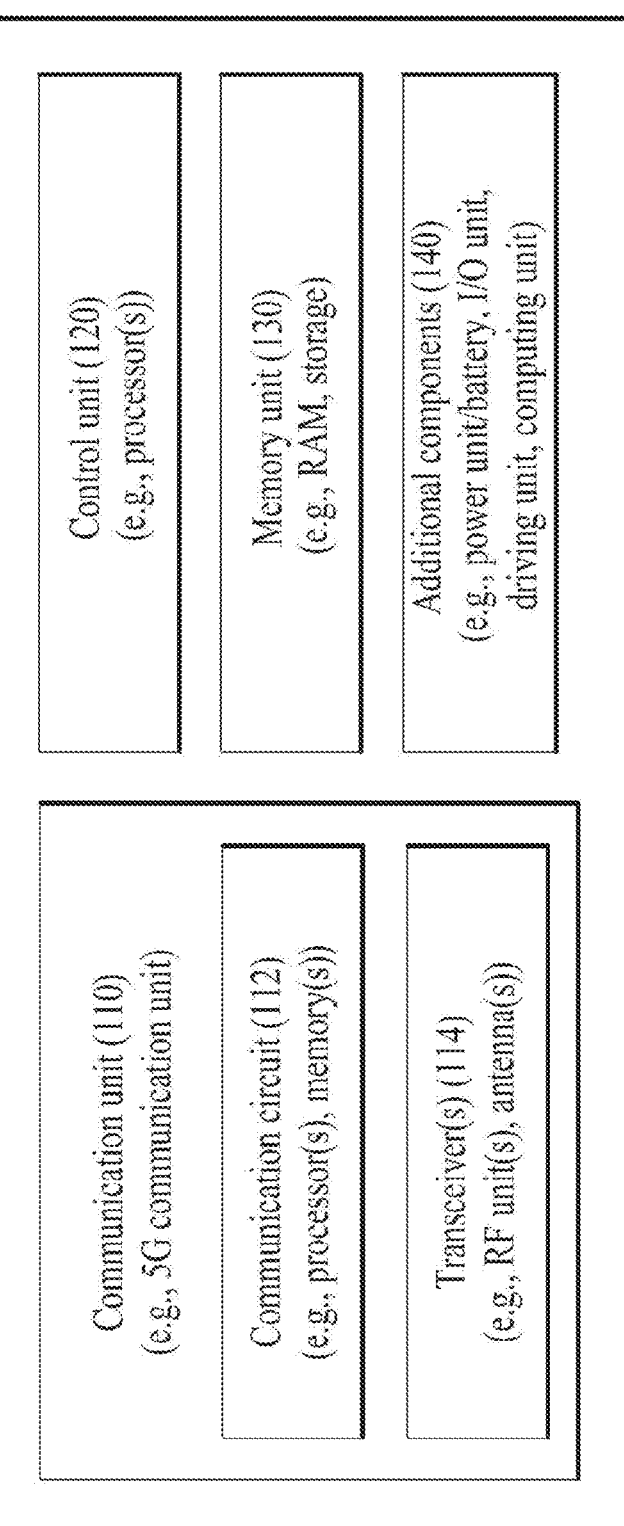

FIG. 18 illustrates another example of a wireless device applied to the present disclosure. The wireless device may be implemented in various forms according to a use-case/service (refer to FIG. 16).

Referring to FIG. 18, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 19:
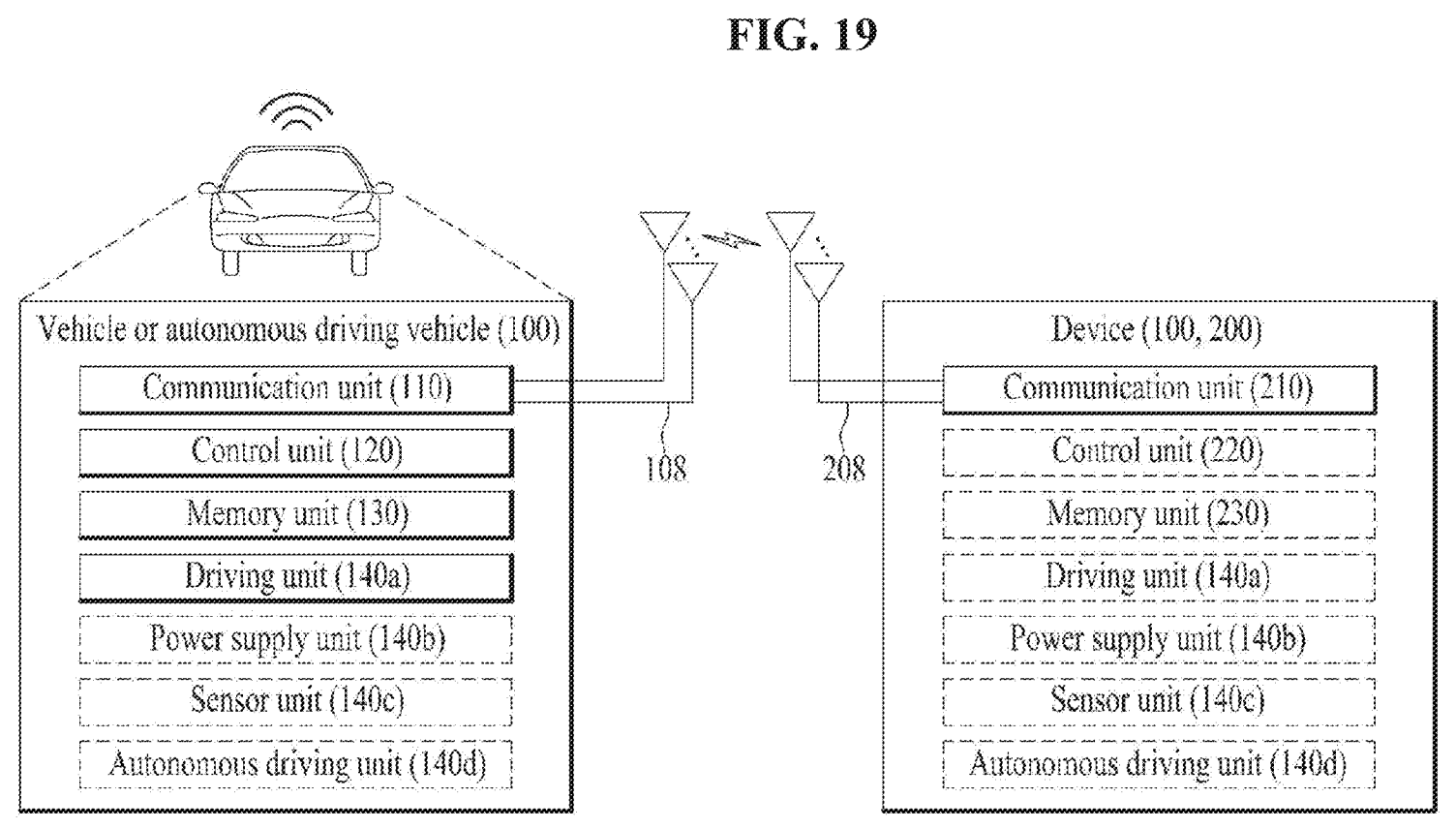

FIG. 19 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 20:
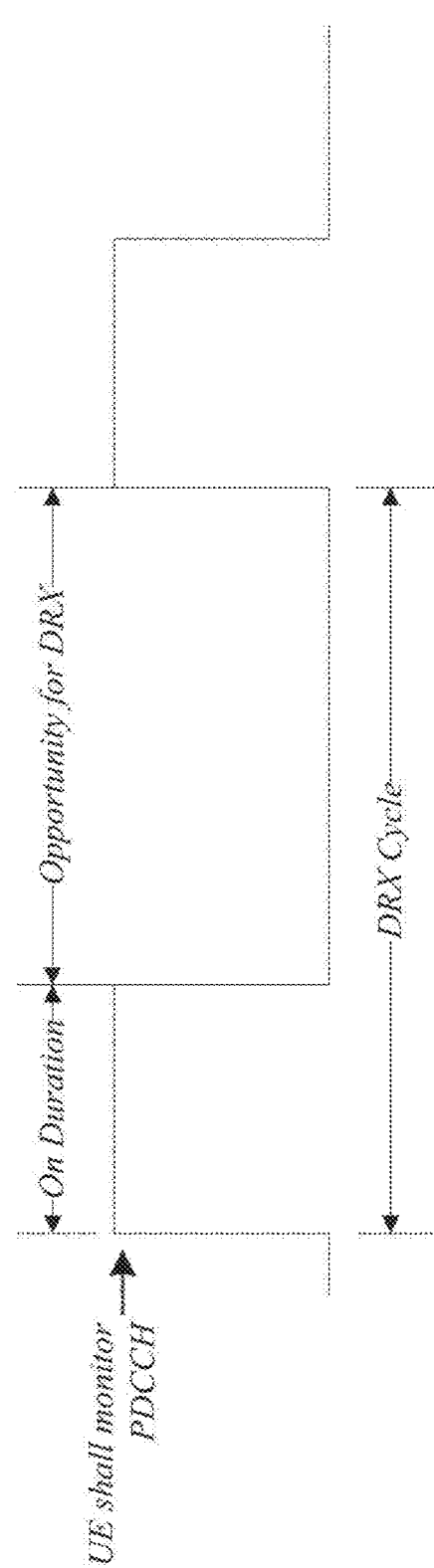
FIG. 20 illustrates an exemplary discontinuous reception (DRX) operation applicable to the present disclosure.

FIG. 20 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC CONNECTED state. The UE performs DRX to receive a paging signal discontinuously in the RRC_IDLE state and the RRC INACTIVE state. DRX in the RRC_CONNECTED state (RRC_CONNECTED DRX) will be described below.

Referring to FIG. 20, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in an embodiment of the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in an embodiment of the present disclosure. Irrespective of whether DRX is configured, PDCCH monitoring may be restricted during a time period configured as a measurement gap.

Table 5 describes a DRX operation of a UE (in the RRC_CONNECTED state). Referring to Table 5, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

37

TABLE 5

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDuration Timer: defines the duration of the starting period of the DRX cycle.

Value of drx-Inactivity Timer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-Inactivity Timer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, an embodiment may be configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

38

The invention claimed is:

1. A method performed by a user equipment (UE), the method comprising:

receiving tracking reference signal (TRS) configuration information related to a radio resource control (RRC) Idle/Inactive state;

receiving a physical downlink control channel (PDCCH) including downlink control information (DCI) for scheduling a physical downlink shared channel (PDSCH) in the RRC Idle/Inactive state; and receiving, in the RRC Idle/Inactive state, i) the PDSCH in PDSCH resources based on the DCI and ii) a TRS based on the TRS configuration information, wherein the DCI includes TRS availability information regarding availability of the TRS, and wherein, for overlapping resources in which TRS resources related to the TRS configuration information overlap at least partially with the PDSCH resources;

the UE determines that the PDSCH is punctured on the overlapping resources, based on that i) a cyclic redundancy check (CRC) of the PDCCH is scrambled with a specific radio network temporary identifier (RNTI) and ii) the TRS availability information indicates presence of the TRS.

2. The method of claim 1, wherein the PDSCH is punctured on the overlapping resources in a unit of a resource element (RE).

3. The method of claim 1, wherein the UE receives the TRS based on that the PDSCH is punctured on the overlapping resources.

4. The method of claim 1, wherein the specific RNTI comprises one of a paging-RNTI (P-RNTI), a random access-RNTI (RA-RNTI), a message B-RNTI (MsgB-RNTI), or a temporary cell-RNTI (TC-RNTI).

5. The method of claim 1, wherein each of the overlapping resources is counted as a complex symbol of the PDSCH.

6. A non-transitory processor-readable recording medium having recorded thereon a program for performing the method of claim 1.

7. A device comprising:

a memory configured to store instructions; and a processor configured to perform operations by executing the instructions, wherein the operations of the processor comprise:

receiving tracking reference signal (TRS) configuration information related to a radio resource control (RRC) Idle/Inactive state;

receiving a physical downlink control channel (PDCCH) including downlink control information (DCI) for scheduling a physical downlink shared channel (PDSCH) in the RRC Idle/Inactive state; and receiving, in the RRC Idle/Inactive state, i) the PDSCH in PDSCH resources based on the DCI and ii) a TRS based on the TRS configuration information, wherein the DCI includes TRS availability information regarding availability of the TRS, and wherein, for overlapping resources in which TRS resources related to the TRS configuration information overlap at least partially with the PDSCH resources;

the device determines that the PDSCH is punctured on the overlapping resources, based on that i) a cyclic redundancy check (CRC) of the PDCCH is scrambled with a specific radio network temporary identifier (RNTI) and ii) the TRS availability information indicates presence of the TRS.

8. The device of claim 7, wherein the device is an application-specific integrated circuit (ASIC) or a digital signal processing device.

9. The device of claim 7, wherein the device is a user equipment (UE).

10. A method performed by a base station (BS), the method comprising:

transmitting tracking reference signal (TRS) configuration information related to a radio resource control (RRC) Idle/Inactive state of a user equipment (UE);

transmitting a physical downlink control channel (PDCCH) including downlink control information (DCI) for scheduling a physical downlink shared channel (PDSCH) during the RRC Idle/Inactive state of the UE; and transmitting i) the PDSCH in PDSCH resources based on the DCI and ii) a TRS based on the TRS configuration information, during the RRC Idle/Inactive state of the UE, wherein the DCI includes TRS availability information regarding availability of the TRS, and wherein, for overlapping resources in which TRS resources related to the TRS configuration information overlap at least partially with the PDSCH resources:

the BS punctures the PDSCH on the overlapping resources, based on that i) a cyclic redundancy check (CRC) of the PDCCH is scrambled with a specific radio network temporary identifier (RNTI) and ii) the TRS availability information indicates presence of the TRS.

11. A base station (BS) comprising:

a transceiver;

a memory configured to store instructions; and a processor configured to perform operations by executing the instructions, wherein the operations of the processor comprise:

transmitting tracking reference signal (TRS) configuration information related to a radio resource control (RRC) Idle/Inactive state of a user equipment (UE);

transmitting a physical downlink control channel (PDCCH) including downlink control information (DCI) for scheduling a physical downlink shared channel (PDSCH) during the RRC Idle/Inactive state of the UE; and transmitting i) the PDSCH in PDSCH resources based on the DCI and ii) a TRS based on the TRS configuration information, during the RRC Idle/Inactive state of the UE, wherein the DCI includes TRS availability information regarding availability of the TRS, and wherein, for overlapping resources in which TRS resources related to the TRS configuration information overlap at least partially with the PDSCH resources:

the BS punctures the PDSCH on the overlapping resources, based on that i) a cyclic redundancy check (CRC) of the PDCCH is scrambled with a specific radio network temporary identifier (RNTI) and ii) the TRS availability information indicates presence of the TRS.

* * * * *